United States Patent
Hatcher

(10) Patent No.: US 11,500,971 B2
(45) Date of Patent: Nov. 15, 2022

(54) SYSTEM FOR CREATING MUSIC PUBLISHING AGREEMENTS FROM METADATA OF A DIGITAL AUDIO WORKSTATION

(71) Applicant: Aurign, Inc., Atlanta, GA (US)

(72) Inventor: Robert Hatcher, Atlanta, GA (US)

(73) Assignee: Aurign, Inc., Atlanta, GA (US)

( * ) Notice: Subject to any disclaimer, the term of this patent is extended or adjusted under 35 U.S.C. 154(b) by 0 days.

(21) Appl. No.: 17/165,713

(22) Filed: Feb. 2, 2021

(65) Prior Publication Data

US 2021/0271738 A1     Sep. 2, 2021

Related U.S. Application Data

(60) Provisional application No. 62/983,639, filed on Feb. 29, 2020.

(51) Int. Cl.
 *G06F 21/16*  (2013.01)
 *G06Q 50/18*  (2012.01)
 *G06F 21/10*  (2013.01)

(52) U.S. Cl.
 CPC ............ *G06F 21/16* (2013.01); *G06F 21/105* (2013.01); *G06Q 50/184* (2013.01)

(58) Field of Classification Search
 CPC ...... G06F 21/16; G06F 21/105; G06Q 50/184
 USPC ........................................................ 713/176
 See application file for complete search history.

(56) References Cited

U.S. PATENT DOCUMENTS

| | | | |
|---|---|---|---|
| 5,883,804 | A | 3/1999 | Christensen |
| 9,661,043 | B2 | 5/2017 | Walker et al. |
| 9,703,866 | B2 | 7/2017 | Ochi et al. |
| 9,959,851 | B1 | 5/2018 | Fernandez |
| 11,158,014 | B2 | 10/2021 | Hatcher |
| 2007/0168462 | A1 | 7/2007 | Grossberg et al. |
| 2011/0145242 | A1 | 6/2011 | Mehrotra et al. |
| 2012/0101948 | A1 | 4/2012 | Aydar et al. |
| 2014/0019498 | A1 | 1/2014 | Cidon et al. |
| 2014/0181991 | A1 | 6/2014 | Srinivasan et al. |

(Continued)

FOREIGN PATENT DOCUMENTS

| | | |
|---|---|---|
| WO | 2016128749 A1 | 8/2016 |
| WO | 2019092728 A1 | 5/2019 |
| WO | 2019093595 A1 | 5/2019 |

OTHER PUBLICATIONS

Related U.S. Appl. No. 17/166,587, filed Feb. 3, 2021, Inventor: Robert Hatcher (copy available in IFW).

(Continued)

*Primary Examiner* — Michael S McNally
(74) *Attorney, Agent, or Firm* — Bekiares Eliezer LLP

(57) ABSTRACT

Systems and methods relating to a platform for creating, monitoring, updating, and executing legal agreements for data files such as a collaborate digital media file using associated metadata. The platform enables music publishing agreements to be generated automatically by taking metadata from a DAW (digital audio workstation) that reflects the activity and contributions of each author associated with a file. Authorship metadata can be recorded on a ledger or blockchain by the platform. The platform enables calculation and disbursement of royalties to be automated by algorithmic determination of terms of an authenticated smart contract using authorship metadata for an associated media file generating the royalty. Authors may concurrently contribute from across a variety of different DAWs, local and remote, and computing resources may be distributed by the platform.

16 Claims, 20 Drawing Sheets

(56) References Cited

U.S. PATENT DOCUMENTS

| | | |
|---|---|---|
| 2014/0337420 A1 | 11/2014 | Wentzloff et al. |
| 2015/0066780 A1 | 3/2015 | Cohen et al. |
| 2016/0044054 A1 | 2/2016 | Stiansen et al. |
| 2018/0137466 A1* | 5/2018 | Claman ............... G06Q 10/103 |
| 2018/0233119 A1 | 8/2018 | Patti et al. |
| 2018/0285996 A1 | 10/2018 | Ma |
| 2018/0343224 A1 | 11/2018 | Lord |
| 2019/0155870 A1 | 5/2019 | Prakash et al. |
| 2019/0182053 A1 | 6/2019 | Varpiola et al. |
| 2019/0227765 A1 | 7/2019 | Soifer et al. |
| 2020/0005744 A1 | 1/2020 | Godunov |
| 2021/0272222 A1 | 9/2021 | Hatcher |

OTHER PUBLICATIONS

Related PCT Application No. PCT/US21/16669 filed Feb. 4, 2021, Inventor: Robert Hatcher (copy available in IFW).

U.S. Non-Final Office Action dated Mar. 24, 2021 cited in U.S. Appl. No. 17/166,587, 23 pgs.

Open Music Initiative Minimum Viable Interoperability 1.0, Meeting & Breakout Notes, Oct. 2016-Apr. 2017, 135 pgs., 2017.

CN105138625 (A kind of method cooperating with art music and the cloud system for musical composition, Jan. 25, 2019, translated, 6 pgs., 2019.

Bogan, "Understanding the Difference Between a Split Sheet and Collaboration Agreement and Why You Should have Both for Every Song Collaboration", Dec. 14, 2018, 5 pgs.

Neverdauskaite et al., "Blockchain Technology in the Music Industry", Master Thesis, May 15, 2019, 186 pgs. CBS Copenhagen Business School.

Spinosa et al., "NLP-based Metadata Extraction for Legal Text Consolidation", ICAIL-2009, pp. 40-49.

Levi et al., "An Introduction to Smart Contracts and Their Potential and Inherent Limitations", Harvard Law School Forum on Corporate Governance, May 26, 2018, 9 pgs.

International Search Report and Written Opinion dated Jun. 15, 2021 cited in Application No. PCT/US21/16669, 20 pgs.

* cited by examiner

SYSTEM FOR CREATING MUSIC PUBLISHING AGREEMENTS FROM METADATA OF A DIGITAL AUDIO WORKSTATION

RELATED APPLICATION

Under provisions of 35 U.S.C. § 119, the Applicant claims the benefit of U.S. Provisional Application No. 62/983,639 filed Feb. 29, 2020, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to creating and filing music publishing agreements automatically by taking metadata from a DAW (digital audio workstation) that reflects the activity and contributions associated with a song.

BACKGROUND

Traditional music publishing agreements are forms that are manually filled out to specify the percentage of ownerships of the song between songwriters. Such an agreement is filed with a music publisher and the publisher collects the royalties on behalf of the songwriters.

Artists typically collaborate in music sessions where each musician is present within a studio and a session recording is made. In some situations, artists collaborate separately where sub-groups of musicians, or individual musicians, record their portion(s) or track(s) at different places and at different times and then combine those portions and tracks to create a final work. Each artist is entitled to a royalty based on his share of collaboration in the work. The conventional strategy is to manually fill out forms known as publishing agreements to specify the percentage of ownerships of the song between songwriters. Such an agreement is filed with a music publisher and the publisher collects royalties on behalf of the authors or copyright holders of the work. This often causes problems because artists usually either fill out the form during the period they are working on the work, or after finalizing the work. In the former case, the publishing agreement does not take into account some of the changes occurred during the preparation phase. In the latter case, parts of the work done by some former artists who no longer part of the final work are missing, hence depriving them of their fair share.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure can help music artist secure their publishing royalties. As disclosed herein, copyright agreements may be automatically generated by using contribution data for each contributing artist in associated metadata for that song to attribute authorship. In some aspects, the song or metadata can be recorded on a ledger or blockchain. In some aspects, the present disclosure may allow for collaboration between different users of different digital audio workstations. In some aspects, the present disclosure may allow for mechanical calculation and disbursement of royalties.

Methods, systems, and computer-readable media for system and methods for tracking authorship attribution and creating music publishing agreements from metadata. A method consistent with embodiments of the present disclosure begins with generating authorship metadata for a data file. The method proceeds with receiving, from a first user, a first contribution to the data file. In one or more embodiments the first contribution includes a change in one or more data values associated with the data file. The method also includes evaluating the first contribution to produce first contribution data. The method further includes recording the first contribution data in the authorship metadata.

The present disclosure also provides a method which begins with receiving metadata for a data file. The method proceeds with parsing the metadata into terms. In one or more embodiments, the terms include a list of users and relative copyright ownership for each user of the list of users. Additionally, the method further proceeds with automatically generating a legal document from the terms representing the relative copyright ownership in the data file for each user of the list of users.

The present disclosure further provides a method which begins with recording one or more changes to a data file during a digital audio workstation session. The method proceeds with collecting user data during the digital audio workstation session. Additionally, the method includes analyzing the user data to produce analytics. In one or more embodiments, documentation containing the analytics are generated. The method proceeds with storing the data file and the documentation.

The present disclosure further provides another method which begins with running a web browser on a computing device. The method proceeds with operating a remote digital audio workstation using the web browser. Furthermore, the method includes recording, in the remote digital audio workstation, changes to a data file. The method proceeds with recording, in the remote digital audio workstation, metadata associated with the data file.

The present disclosure further provides yet another method which begins with determining that a rendered media file having a plurality of authors has generated a royalty. In one or more embodiments, the rendered media file has associated therewith metadata containing one or more relative authorship values for the plurality of authors. For each author of the plurality of authors, a relative authorship value may be identified from the metadata. The method may proceed with determining a disbursement amount according to the relative authorship value and the royalty and then facilitating a payment of the disbursement amount to the author.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
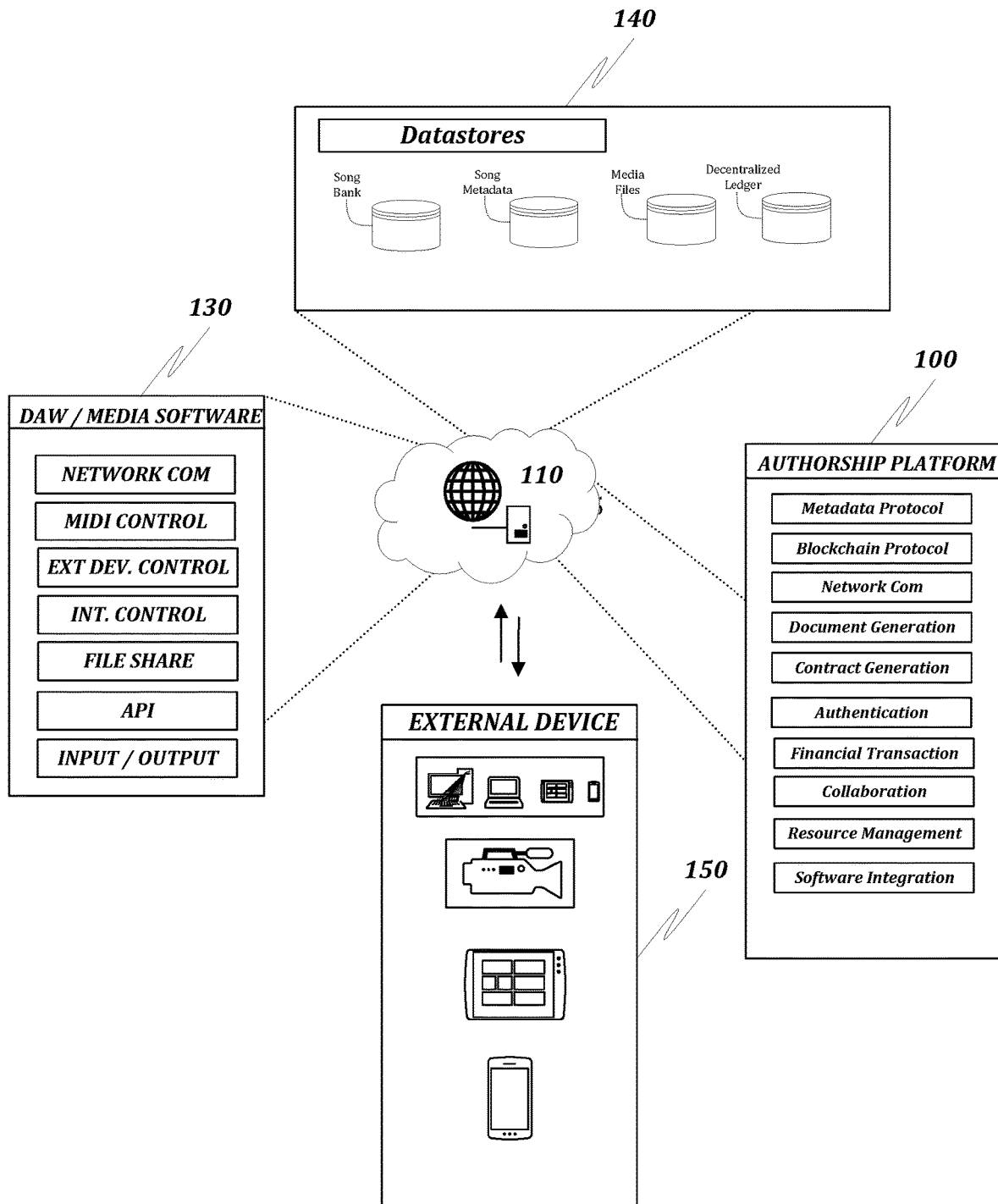
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while examples are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Furthermore, while many aspects and features relate to, and are described in, the context of digital audio workstations and automated determination of authorship rights to collaborative works, embodiments of the present disclosure are not limited to use only in this context. For example, embodiments of the present disclosure may also apply to collaborative software, video, or other media generation, etc.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present method include an authorship or metadata control platform that facilitates generation of legal documents relating to authorship, copyright ownership, and royalty disbursement by reading and writing authorship information, or data that can be used to generate authorship information, to metadata associated with a media file. For example, when a user makes changes to a media file, the changes are recorded. The metadata may be stored in, for example, a distributed ledger or other blockchain based technology, providing a verified and immutable record. Downstream, the metadata may be used for various applications, such as, but not limited to, determining a percentage of ownership interest in the media file associated with the metadata. Accordingly, embodiments of the present disclosure may utilize the metadata to determine relative authorship of a work and to generate a publishing contract.

Embodiments of the present disclosure may operate in conjunction with a digital audio workstation ("DAW") or other recording/media generation application that music artists use to record and create songs or other media. In the context of the present disclosure, such applications may be used to collaboratively create songs and to record metadata reflecting each user's contributions to the song.

In some embodiments, data points from the DAW may be collected to automatically generate a music publishing agreement, which may be mechanically executed. In some embodiments, the data points may be stored in a metadata file. Using data science techniques, the platform may analyze metadata and provide accurate contribution percentages, manage contracts, review contracts, and verify data kept on a ledger or blockchain. Data may be stored in a database through one of several processes. The ledger or blockchain can serve as a public database that details the contributions and ownership of a work (e.g., a song) in real-time. As such, the ledger or blockchain creates a record for every artist contribution and ownership rights to a song. The process of updating a digital audio workstation and its associated metadata may occur in real-time. Similarly, the process of updating a digital audio workstation and its associated metadata may occur at pre-defined time intervals (e.g., each 10 seconds, each 1 minute, every hour, every other day, etc.). The data may be stored in its raw form or a "promise" of the data may be stored on a ledger and analyzed by a centralized data science platform. The results are then stored in reference to the promised data, fulfilling the promise. This may be done sequentially, so the data and promise may be asynchronously stored.

The following provides on example of the various embodiments disclosed herein. Consistent with embodiments of the present disclosure, data may be collected on the various actions performed by users while they are using one or more DAWs or similar interface to create a project file. The DAWs may be integrated with the various functionality described herein and/or operate in conjunction with a platform providing the various functionality described herein.

For instance, using one or more DAWs, recording users may record different tracks to a project, editing users may modify those tracks, producer and engineer users may alter and mix the tracks. The data captured from those actions may be analyzed using various data processing techniques (remote or locally). From that data, various parameters may be extracted, such as, but not limited to, user profile, action performed, duration, files recorded, files modified, tracks created, tracks edited, and various other data associated with DAW related action-based functions, settings, and parameters. These parameters may be used, for instance, to attribute authorship to the project.

During the course of this work, a project file or files may be saved and shared between multiple DAWs, with merging of tracks between various files. When a file is loaded, the DAW may be configured to retrieve metadata associated with the project file from the stored location. Embodiments of the present disclosure may track each action performed by the DAWs and update the metadata associated with each project file based on the actions performed. The metadata may be updated with, for example, the parameters associated with the action. In some embodiments, where multiple users use the same DAW, user profile information may be obtained from the DAW, digital private keys, or manually inputted by an administrative user, or obtained through other means. Together, metadata associated with project may be assembled and stored.

Once a file is ready for finalization, the system may generate a smart contract. The system can pull authorship data from metadata. In one or more embodiments, the system can prompt users to input royalty/splits between authors and other interested parties. The system may also prompt users to enter publisher/distribution rights, etc.

Furthermore, the system may be configured to retrieve digital wallet data from the authors and other interested parties. Advantageously, a legal document may be generated and transmitted for execution (e.g., e-signature). Once the legal document is signed, a digital smart contract may be generated and then deployed. In one or more embodiments, to play the file that contains the work, it may be required that a private key may be retrieved.

In one or more embodiments, to retrieve a private key, digital wallet information may be required to pay each time the file is played. Private key usage may be tracked. The fees collected each time the file is played may be disbursed to digital wallets of interested parties.

One example use of the present disclosure is the following: While users are using a digital audio workstation, data is collected on the software. In the background this data is analyzed using several mathematical techniques (remote or locally). Upon completion of a session, or during, documentation publishing agreements are generated referring to the exact analytics captured during the DAW software being used. This data is then stored in a centralized or decentralized manner. Additionally, but optionally, this data is stored, using several storage schemes (depending on the use case), in a decentralized manner such that participating users can individually verify the authenticity and integrity of the documents created, their current state, and their historical information on usage, creation, changes, users associated with them, royalties collected, etc. The metadata recorded on the ledger may be monitored such that when an event occurs that triggers a royalty, the disbursement to the authors occurs mechanically.

In a first aspect, the present disclosure provides a manner of giving authorship attribution to authors of their created works. A DAW may be licensed to a particular user. In one or more embodiments, the user is the basis for defining authorship for any file that DAW edits. The DAW may contain in its memory user information to ensure that the DAW is linked to the appropriate user. In one or more embodiments, the DAW can be registered with Aurign™. Accordingly, a DAW can both generate and maintain authorship metadata.

Multiple DAWs can be configured to read and write authorship metadata for the same raw file. As users create and edit files, each revision or contribution is tracked and written to the metadata. If prior authors' contributions are edited or removed by a new author, the system may be configured to re-assign contributions (e.g., to a default minimum contribution level) to the prior authors. Furthermore, a DAW can be further configured to write the authorship metadata to a rendered media file that was based on the raw DAW file.

In a second aspect, the present disclosure provides a manner for generating legal documents. For example, authorship metadata can be used to generate a legal document that pertains to the copyrights, and other legal rights, to the created work (e.g., song).

In a third aspect, the present disclosure provides the tracking of activity within a blockchain or other distributed ledger technology (DLT). Both a data file and authorship metadata can be recorded to and retrieved from a ledger. In one or more embodiments, permissions may be governed by a recording application. The permissions may be implemented by one or more algorithms which can update the data on a song while the song is being recorded.

Each version of a data file may have authorship metadata linked therewith on a digital ledger. To link a data file to its authorship metadata stored on a digital ledger, a hash or link connects different versions of a song's data to the authorship metadata on the digital ledger. In one or more embodiments, once a song or other work is created, a folder is created on the blockchain, and within the folder contains a history of changes made to the song.

In a fourth aspect, the present disclosure may provide DAW integration between local and online DAWs. DAW integration may be used to facilitate the operations of two or more DAWs to increase online functionality. In one or more embodiments, an API connects DAWs instituted on local machines to DAW instances in the cloud that is access by a web browser. DAW integration may provide a solution to the problem that cloud-based DAW instances often lose significant functionality. Therefore, DAW integration allows users to collaborate with other users online, and most notably, allows users to leverage the use of local machines to maintain the functionality and performance needed to create a song.

As such, a DAW can be configured as an online DAW for remote collaboration. An online or cloud-based DAW instance may record changes performed by each party (e.g., author) and record its associated authorship metadata.

In a fifth aspect, the present disclosure may perform mechanical royalty calculations and disbursements. For example, when a rendered media file that contains a work (e.g., song), is played, streamed, or performed in any manner, authorship metadata associated therewith can be used to calculate a royalty payment to the appropriate entity. The system may then facilitate a mechanical royalty payout. A smart contract can also be used to collect and distribute royalties as a trust-less custodian.

Embodiments of the present disclosure may comprise methods, systems, and a computer readable medium comprising, but not limited to, at least one of the following:
 A. A Network Layer;
 B. An Authorship/Collaboration Platform Layer;
 C. A DAW/Media Layer;
 D. A Datastore Layer;
 E. An External Device Layer;

In some embodiments, the present disclosure may provide an additional set of layers or modules for further facilitating the software and hardware platform. The additional set of layers/modules may comprise, but not be limited to:
 F. An Account Layer; and
 G. A Decentralized Exchange Layer.

Details with regards to each layer/module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specifications. Each component disclosed for one module may be mixed with the functionality of another module. In the present disclosure, each component can be claimed on its own and/or interchangeably with other components of other modules.

The present disclosure, generally, provides for the following aspects: 1) attribution of authorship; 2) generation of legal documents; 3) data and rights tracking using distributed ledger technology; 4) collaborative environments for authorship; and 5) licensing fee tracking and distribution. It should be noted that, in various aspects of the present disclosure, DAW, and hence its associated metadata, can only be updated by authorized users. That is, if the user fails the authorization process, the unauthorized use is not allowed to make any changes in the DAW.

Network Layer

A network layer according to some embodiments allows for transfer of variable-length network packets from a source to a destination host via one or more networks. The network layer includes protocols that enable the other layers to communicate and exchange data over a network.

Authorship/Metadata Control Platform Layer

A platform or platform layer according to some embodiments includes, inter alia, modules that may enable or facilitate automatic determination of authorship of a collaborative digital media file and modules that may enable or facilitate reading, writing, and analyzing metadata for a digital media file. In various embodiments, the platform may be a cloud-based or web application, may be hosted on a local machine, or may be integrated as a "plug-in" to a digital audio workstation or other media generation software. Specific modules and features of this layer are disclosed in greater detail below.

DAW/Media Layer

According to various embodiments, a DAW/Media software layer may be used to manipulate or create a digital audio or other media file. Such software may be hosted on a local machine or may be a cloud-based or web application that connects to the network layer to communicate with the other layers. In some embodiments, DAW requires the user to input identifying information into the DAW.

DAW/Media Software layer can perform several tasks for music creation and recordation. For example, a DAW/Media Software layer may employ a digital audio processor to record, edit, and mix audio digitally. The layer can also employ a MIDI sequencer to record, edit, and mix MIDI notes. Further, the layer can also employ virtual instruments by translating MIDI information. Lastly, the DAW/Media Software layer can create music notations (e.g., by transforming MIDI notes into printable sheet music).

The DAW/Media Software layer can be licensed to a user who will be attributed authorship for any work stored in a file that the DAW edits. The user's information may be stored in the DAW. For example, the user's contact information, label affiliation, management, legal representation, etc. may be stored in a local or cloud-based DAW.

The DAW/Media Software layer may prompt the user to confirm that they are the true author of the latest contribution when it is determined that the data file has been changed before the DAW updates the authorship metadata. In various embodiments, a specific instance of a DAW can be registered with a third-party service that can perform one or more aspects of the present disclosure.

Datastore Layer

According to various embodiments, a datastore layer may include local or remote storage of media files, a media bank, metadata, decentralized ledgers or blockchains, or other data storage. Data may be written to or read from the datastore layer via physical access or through connection with the network layer.

External Device Layer

According to various embodiments, one or more external devices may be included in an external device layer, either by being either connected to a local machine or through the network layer, in the operating environment. Such external devices may include, by way of non-limiting example, musical instruments, cameras, midi controllers, handheld devices, etc. In some embodiments, the external device layer may also include:

UI Layer

A UI Layer may be employed as an interface through which the user of a user device can send to and receive from data. The UI layer may be part of a personal device such as a smart phone or a personal computing device such as a desktop computer or a laptop.

API Layer

An API Layer may compile a user's commands into machine readable codes and vice versa. The API layer can be an application running on a web browser, or a stand-alone application running on user's device.

Account Layer

According to various embodiments, an account layer may comprise, for example, one or more banking or financial systems. Royalties may be received from financial institution systems hosted on the Account Layer and processed by the platform through the network layer. In some embodiments, the platform calculates disbursements based on any royalties, and may distribute the disbursements to systems on the account layer. Such financial transactions may occur through the network layer, or may be, for example, physically printed and mailed.

Decentralized Exchange Layer

In some embodiments, a decentralized exchange layer may be used to facilitate financial transactions. For example, royalties and disbursements may be received and sent to a decentralized exchange, such as blockchain, ledger, cryptocurrency exchange or cryptocurrency wallet hosted on the decentralized exchange layer. It should be noted that, throughout the present disclosure, cryptocurrency may be used interchangeably with any other form of digital asset or securitized token and that a wallet may refer to any means by which the digital assets may be attributable to an owner of the digital assets.

Platform Methods Overview

The following depicts a plurality of example methods that may be performed by at least one of the aforementioned modules/layers, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device may be employed in the performance of some or all of the stages disclosed with regard to the methods. Similarly, an apparatus may be employed in the performance of some or all of the stages of the methods. As such, the apparatus may comprise at least those architectural components as found in computing device.

Furthermore, although the stages of the following example methods are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, methods may be performed by at least one of the modules disclosed herein. The methods may be embodied as, for example, but not limited to, computer instructions stored in a tangible readable medium, which when executed by a machine, perform the method. The methods may comprise the following stages:

Aspect 1 generating authorship metadata for a data file;

receiving, from a first user, a first contribution to the data file, the first contribution comprising a change in one or more data values associated with the data file;

evaluating the first contribution to produce first contribution data; and recording the first contribution data in the authorship metadata.

Aspect 2 receiving metadata for a data file;

parsing the metadata into terms, the terms comprising a list of users and relative copyright ownership for each user of the list of users; and automatically generating a legal document from the terms representing the relative copyright ownership in the data file for each user of the list of users.

Aspect 3 recording one or more changes to a data file during a digital audio workstation session;

collecting user data during the digital audio workstation session;

analyzing the user data to produce analytics;

generating documentation containing the analytics; and storing the data file and the generated documentation.

Aspect 4 running a web browser on a local computing device;

operating a remote digital audio workstation using the web browser;

recording, in the remote digital audio workstation, changes to a data file; and recording, in the remote digital audio workstation, metadata associated with the data file.

Aspect 5 determining that a plurality of authors of a work, which is stored in a rendered media file, are due a royalty payment, the rendered media file having associated therewith metadata containing one or more relative authorship values for the plurality of authors; and, for each author of the plurality of authors;

identifying, from the metadata, a relative authorship value for the author;

determining a disbursement amount for a royalty payment according to the relative authorship value of the plurality of authors; and facilitating a royalty payment of the disbursement amount to the author.

Although the aforementioned methods have been described to be performed by the platform, it should be understood that computing device may be used to perform the various stages of the method. Furthermore, in some embodiments, different operations may be performed by different networked elements in operative communication with computing device. For example, a plurality of computing devices may be employed in the performance of some or all of the stages in the aforementioned method. Moreover, a plurality of computing devices may be configured much like a single computing device. Similarly, an apparatus may be employed in the performance of some or all stages in the method. The apparatus may also be configured much like computing device.

According to an aspect of the present disclosure, a method for synchronized digital audio workstation is disclosed. The method comprises steps of identifying, from a user device, a first digital audio workstation (DAW) instance, wherein the first DAW comprises at least an identification of a user of the user device and an audio data file; determining whether the user of the user device is an authorized user; and generating a first metadata based at least in part on at least one action performed by the first DAW, wherein the first metadata comprises a first contribution value by the user to the audio data file.

According to another aspect of the present disclosure, a method for synchronized digital audio workstation operations is disclosed. The method comprises steps of obtaining, from a user device, a first digital audio workstation (DAW) instance, wherein the first DAW comprises at least an identification of a user of the user device and an audio data file; generating a first metadata based at least in part on at least one action performed by the first DAW, wherein the first metadata comprises a first contribution value by the user to the audio data file; generating a first document based on the first DAW and first metadata, wherein the first document comprises information about copyrights of the audio data file.

According to yet another aspect of the present disclosure, a method for synchronized digital audio workstation operations is disclosed. The method comprises steps of identifying, from a user device, a first digital audio workstation (DAW) instance, wherein the first DAW comprises at least an identification of a user of each user device and an audio data file; generating a first metadata based at least in part on at least one action performed within the first DAW, wherein the first metadata comprises a first contribution value by each user to the audio data file; calculating a share for each user based on a number of times the audio data file is streamed or played and the first contribution value by the user to the audio data file; and generating a first ledger for the first DAW based at least in part on the calculated share and the first DAW.

According to still another aspect of the present disclosure, a method for synchronized digital audio workstation provision are disclosed. The method comprises steps of providing a first DAW associated with a first user device, wherein the first DAW comprises at least one of a first identification of a user of the first user device and an audio data file; receiving a request from a second user device to access the first DAW; upon determining that the second user device is an authorized user device, granting, to second user device, access to the first DAW; updating the first DAW by adding a second identification of a user of the second user device; and generating a first metadata based at least in part in the first DAW, wherein the first metadata comprises a first contribution value by the first user to the audio data file and a second contribution by the second user to the audio data file. DAW integration allows users to collaborate with other users online, and most notably, allows users to leverage the use of local machines to maintain the functionality and performance needed to create a song.

According to another aspect of the present disclosure, a method for synchronized digital audio workstation provision is disclosed. The method comprises steps of identifying a first digital audio workstation (DAW) instance, wherein the first DAW comprises at least an identification of a user of each user device associated with the first DAW and an audio data file; generating a first metadata based at least in part on the first DAW, wherein the first metadata comprises a first contribution value to the audio data file for the user of each user device; and calculating, for the user of each user device, a share based on a number of times the audio data file is streamed or played and the first contribution value associated with the user.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. By way of non-limiting example, an authorship/metadata analysis platform may be hosted on, for example, a cloud computing service. In some embodiments, the platform may be hosted on a computing device. A user may access platform through a software application and/or hardware device. The software application may be embodied as, for example, but not be limited to, a website, a web application, a desktop application, and a mobile application compatible with the computing device. One possible embodiment of the software application and/or hardware device may be provided by a suite of products and services provided by Aurign™.

FIG. 1 further illustrates one possible operating environment through which a platform consistent with embodiments of the present disclosure may be provided. By way of non-limiting example, a platform 100 for providing the methods and systems for may be hosted in both a blockchain protocol ("on-chain") and off of a blockchain protocol ("off-chain"). One possible embodiment of the platform 100 may be provided by the Ethereum protocol provided by ethereum.org. It should be understood by one having ordinary skill in the art that layers and stages performed by the layers may be either "on-chain" or "off-chain." The present disclosure anticipates embodiments with variations as to which stages may be performed "on-chain" or "off-chain." It should also be understood by one having ordinary skill in the art that "on-chain" or "off-chain" layers or stages may be implemented as protocols for doing a particular, well-defined, circumscribed function.

Accordingly, embodiments of the present disclosure provide a software and hardware platform, implemented within one or more network architectures and protocols, comprised of a distributed set of computing elements, including, but not limited to:

A. Metadata Protocol Module

According to various embodiments, the platform 100 may include a metadata protocol module. The metadata protocol module may include sub-modules for reading metadata, writing metadata, analyzing metadata, and generating metadata. For example, the metadata protocol module may generate authorship metadata from a log of changes to a digital media file. The authorship data may then be recorded in metadata associated with the file. After the file has been changed multiple times by different users, the metadata protocol module may read the metadata and analyze the authorship data to determine relative authorship for each user who made a contribution to the file. The metadata protocol module in some embodiments may send and receive digital media files or metadata from the DAW/software layer.

In the event that the contribution by an author is deleted from the data file, the metadata protocol module may institute a sub-routine to determine whether the author of the deleted contribution is deserving of authorship in the final work. For example, if it is determined that the detected contribution led to the final work (e.g., a song) due to the evolutionary nature of the created work, the DAW, for example, may assign an authorship value to the author for royalties (e.g., a minimum pre-determined authorship value). Advanced techniques such as machine learning maybe used to determine the relative authorship values for authors whether their contributions were deleted from or were maintained in the final work.

B. Blockchain Protocol Module

According to various embodiments, the platform 100 may include a blockchain protocol module. The blockchain protocol module may read and write metadata and authorship information to a decentralized ledger or blockchain. Additionally, the blockchain protocol module may facilitate transfer of digital or cryptocurrency, such as by reading transactions from, writing transactions to, or validating transactions on a blockchain or ledger. In some embodiments, the blockchain protocol module may periodically monitor one or more ledgers or blockchains for changes in a digital media file and may automatically inform another module or layer of the change, for example, when it is determined that one or more authors of a work are due a royalty payment which may be recorded in a ledger, the blockchain protocol will detect the change during the next periodic monitoring and may inform the document generation module or contract module in near real-time. In various embodiments, the blockchain protocol module can facilitate the process of writing data to a sequence of blocks in a blockchain framework, particularly, an Ethereum framework. For Ethereum frameworks, block sizes are not limited and are capable of storing authorship metadata along with records associated with digital currency transactions. In some embodiments, a peer-to-peer file system is implemented within an Ethereum blockchain framework to facilitate file storage.

C. Network Communication Module

According to some embodiments, a network communication module may enable or facilitate connection of the platform 100 to the network layer or to devices in networked communication with the platform. The network communication module may also allow the platform to monitor networked devices such as computing systems, cloud environments, or datastores.

D. Document Generation Module

According to some embodiments, a document generation module may facilitate generation or modification of documents. The document generation module may receive data from or generate information from data received from the metadata protocol module. The document generation module may also receive data, such as user information, bank account information, cryptowallet information, etc., from the financial transaction module, the account layer, the decentralized exchange layer, the DAW layer etc. The document generation module may extract terms from received data and create various documents in various formats such as, but not limited to legal documents, contracts, royalty agreements, copyright agreements, copyright application forms, other legal documents, etc.

E. Contract Generation Module

According to various embodiments, a contract generation module may generate a contract based on terms generated from data received by the document generation module. In some embodiments, the contract generation module may be a sub-module of the document generation module. The contract generated may be a "smart contract." For example, a smart contract may include a set of rules, conditions, or events that algorithmically or mechanically determine when the contract is executed and under which terms. Terms of the smart contract may be automatically updated by periodic monitoring of data regarding, for example, authorship and royalty generation, changes in law, property assignments, or by automatically adjusting the terms to reflect a detected change. When a royalty event is detected, the smart contract may mechanically update terms, such as authorship percentages (e.g., relative authorship values), to reflect any changes to the media file or associated metadata. The contract generation module may communicate with the authentication module to determine whether a contract has been signed or otherwise authorized before being executed.

F. Authentication Module

The various implementations, the authentication module may be a sub-module of the document generation module or the contract generation module. In some embodiments, an authentication module may generate e-signature requests or may validate or verify that a signature or authentication has been received. Authentication may be obtained, for example, by an e-signature service connected to the network layer, through user information received from a DAW user account, or through another layer or module. In some embodiments, once authentication has been received for each party to a contract, the authentication module may automatically provide verification to the contract generation module for execution of a contract.

G. Financial Transaction Module

According to some embodiments, a financial transaction module may be included in the platform. The financial transaction module may receive user (author, producer, label, etc.) information, such as payment or financial account information or other information used to send and receive payments. The financial transaction module may include sub-modules to facilitate the receipt and disbursement of royalty payments to authors. For example, royalty payments may be achieved by sending, receiving or processing a physical check or electronic money transfer, or by reading from, writing to, or verifying a transaction on a decentralized ledger or blockchain.

H. Collaboration Module

According to some embodiments, the platform 100 may include a collaboration module. The collaboration module may include sub-modules such as an application programming interface to enable or facilitate collaboration between authors of a collaborative work that is stored in aa digital media file. For example, the collaboration module may monitor or analyze simultaneous contributions by multiple artists to a digital media file during a session. The artists may collaborate different computing devices or network of synchronized DAWs connected via a network to create a work. The collaboration module may record and analyze the respective changes to the file made by each user, and compute authorship data reflecting the relative contributions of each author during the session, which may then be provided to the metadata protocol layer.

I. Resource Management Module

According to various embodiments, the platform may be hosted on a distributed network of computing devices. The platform 100 may analyze the resource use, such as the percentage of CPU or RAM being used, for each machine, and may distribute tasks across the networked devices to optimize performance. Different users may require different resource consumption at different times, or may have differing resource availability on their devices. By managing the resources used, multiple users may "share" computing resources to improve performance. Additionally, computing devices not associated with a particular user may be in a networked connected to the platform 100. Computing resources on such a device may also be accessible by users of the platform 100 to improve performance.

J. Software Integration Module

According to various embodiments, a software integration module may include protocols for allowing operative networked communication with various software platforms, such as DAWs or other media creation software. The software integration module may enable the platform 100 to be used as a "plug-in" or otherwise incorporated into or operable with diverse software.

III. Platform Operation

Embodiments of the present disclosure provide a hardware and software platform operative by a set of methods and computer-readable media comprising instructions configured to operate the aforementioned modules and computing elements in accordance with the methods. The following depicts a plurality of example methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 900 may be employed in the performance of some or all of the stages disclosed with regard to the methods. Similarly, an apparatus may be employed in the performance of some or all of the stages of the methods. As such, the apparatus may comprise at least those architectural components as found in computing device 900.

Furthermore, although the stages of the following example methods are disclosed in a particular order, it should be understood that each order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

A. Master Methods

Consistent with embodiments of the present disclosure, the following methods may be performed by at least one of the aforementioned modules. The methods may be embodied as, for example, but not limited to, computer instructions, which when executed, perform the method. The methods may respectively comprise the following stages:

Aspect 1

Figure 2:
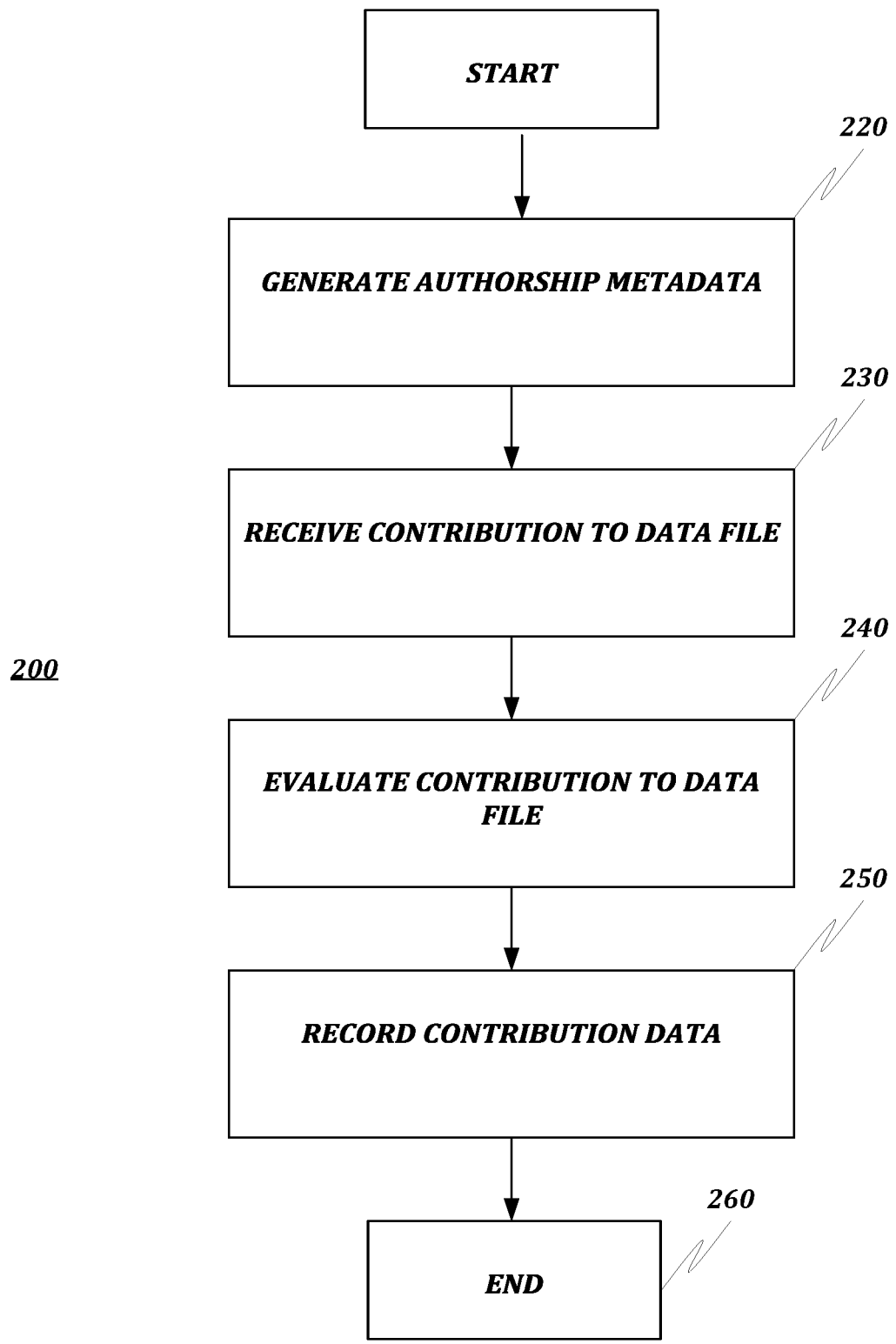
FIG. 2 is a flow chart of a method for providing attribution of authorship.

FIG. 2 is a flow chart setting forth the general stages involved in a method 200 consistent with an embodiment of the disclosure for providing authorship platform 100. Method 200 may be implemented using a computing device 900 or any other component associated with platform 100 as described in more detail below with respect to FIG. 8. For illustrative purposes alone, computing device 900 is described as one potential actor in the following stages.

Method 200 may begin at starting block and proceed to stage 220 where computing device 900 may generate authorship metadata for a data file.

From stage 220, where computing device 900 generates authorship metadata, method 200 may advance to stage 230 where computing device 900 may receive a first contribution to the data file from a first user. The first contribution may comprise a change in one or more data values associated with the data file. For example, changes to a data file may relate to a part of a song being recorded by a user, such as a musician (e.g., music producer) of a digital audio workstation.

Once computing device 900 receives the first contribution in stage 230, method 200 may continue to stage 240 where computing device 900 may evaluate the first contribution to produce first contribution data. In various embodiments, evaluating the first contribution may include determining whether a change to the authorship metadata is warranted. For example, if the first contribution constitutes an insignificant change to the work, such as a change to the filename of the data file, no change will be made to the authorship metadata. The primary objective of stage 230 is to ensure that authors receive proper credit and attribution for their contributions.

After computing device 900 evaluates the first contribution in stage 240, method 200 may proceed to stage 250 where computing device 900 may record the first contribution data in the authorship metadata. For example, the authorship metadata may be automatically recorded when a changed data file is saved in a digital audio workstation, such as by being written onto a digital media file in a digital audio workstation or other media generation software application. Further, the digital audio workstation may have account information related to a present user of the DAW, such as authentication information, bank account information, personal information, etc.

In some embodiments, a raw media file created in a digital audio workstation without metadata, or without authorship metadata as disclosed herein may have authorship metadata written onto it to produce a media file with associated authorship metadata.

According to various embodiments, the authorship metadata may be recorded on a ledger, blockchain, or other centralized or decentralized datastore.

Once computing device 900 records the first contribution data in stage 250, method 200 may then end at stage.

In some embodiments, the method 200 may further comprise receiving a second contribution to a data file from a second user. The second contribution may also comprise a change in one or more data values associated with the data file. The second contribution may be evaluated to produce second contribution data. The authorship metadata may be modified based on the second contribution data, or the first and second contribution data. A relative authorship value may then be determined for the first and second user. Similarly, a plurality of users may make a plurality of contributions. The contributions may be analyzed to produce a plurality of contribution data, and a relative authorship value may be determined for each user. Further, one or more users may be using a different digital audio workstation to make respective contributions to the data file. The DAWs may be hosted on local or remote computing devices or may be in the form of a cloud-based or web application. The different digital audio workstations may each use a module as disclosed herein to generate, read, edit, change, monitor, or otherwise interact with authorship metadata. Additionally, the authorship data may also be written to a ledger or blockchain, which may be decentralized, or a remote data storage, and read or monitored outside of the DAW(s).

In some embodiments, one or more contributions to a data file may be evaluated in real time as the contribution is being made to produce contribution data. Further, multiple users may simultaneously make contributions which may be together evaluated in real time. Such evaluation may determine, algorithmically, an authorship value which may be written into metadata for the file. Still further, machine learning may be used to evaluate the contributions, for example, by optimizing the algorithmic determination of attribution of authorship based on data points reflecting changes to a digital media file. For example, data points related to a song may include the effect of the change to the overall song, the time spent by the user when making changes to the song, etc.

Aspect 2

Figure 3:
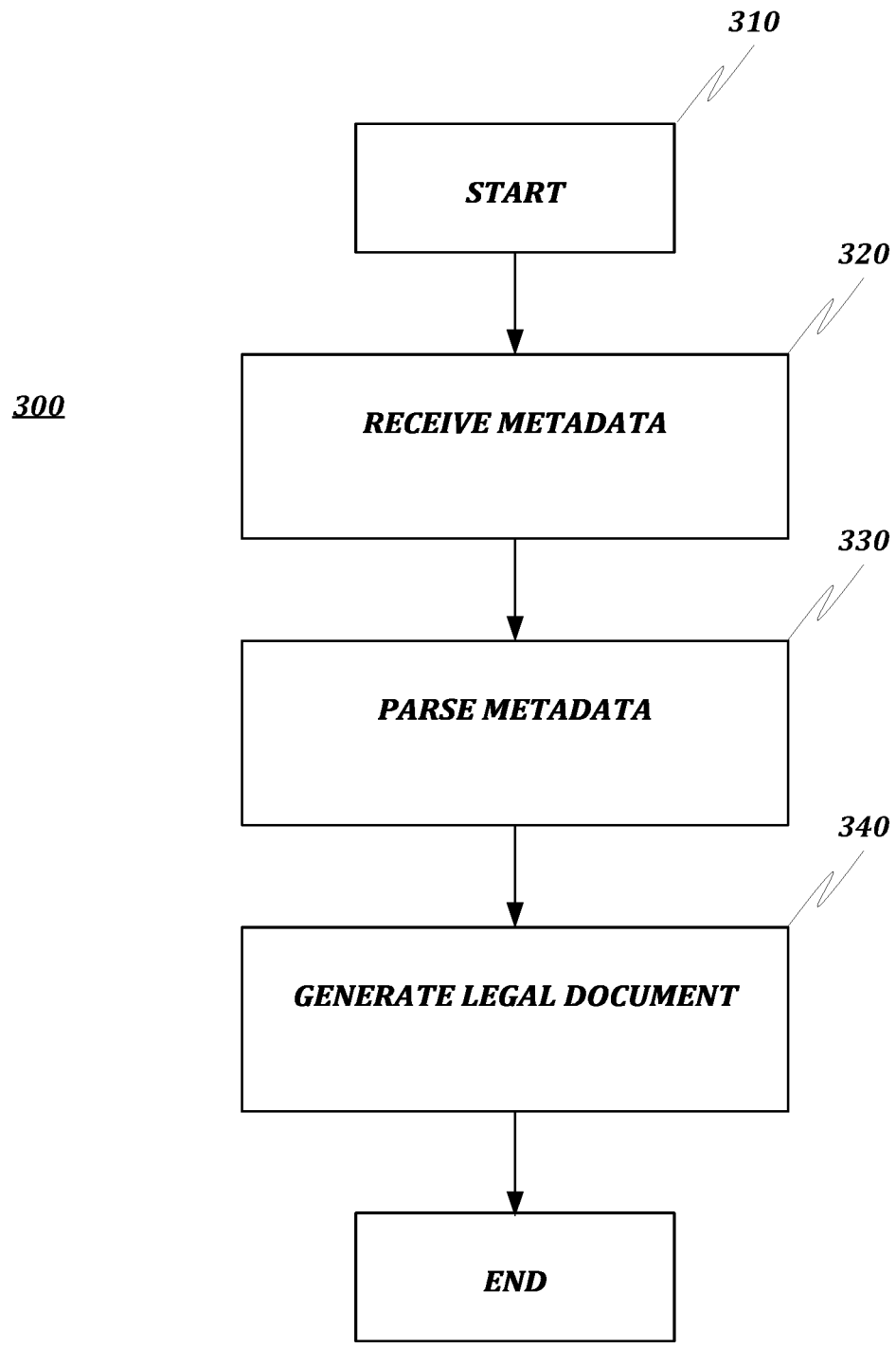
FIG. 3 is a flow chart of a method for providing generation of a legal document.

FIG. 3 is a flow chart setting forth the general stages involved in a method 300 consistent with an embodiment of the disclosure for providing authorship platform 100. Method 300 may be implemented using a computing device 900 or any other component associated with platform 100 as described in more detail below with respect to FIG. 8. For illustrative purposes alone, computing device 900 is described as one potential actor in the follow stages.

Method 300 may begin at starting block and proceed to stage 320 where computing device 900 may receive metadata for a data file. For example, the metadata may contain authorship information for a digital media file which may be read by a DAW.

From stage 320, where computing device 900 receives metadata, method 300 may advance to stage 330 where computing device 900 parses the metadata into terms. The terms may comprise a list of users and relative copyright ownership or authorship percentage for each user in the list. Other information may also be available and parsable from the metadata.

Once computing device 900 parses the metadata in stage 330, method 300 may continue to stage 340 where computing device 900 automatically generates a legal document from the parsed terms representing the relative copyright ownership in the work stored in the data file for each user in the list of users. For example, the legal documents may be related to any form used to prepare a copyright application, royalty agreement, etc. The generated legal documents may express a transfer of property rights to the created work. For example, the legal documents may include one or more single song agreements, exclusive song writer agreements, co-publishing agreements, administration agreements, collection agreements, sub-publishing agreements, merchandising agreements, synchronization agreements, licensing agreements, purchasing agreements, etc.

After computing device 900 generates the legal document in stage 340, method 300 may end at stage.

In some embodiments, the method 300 may further comprise a manner to facilitate obtaining a signature or authorization from each user of the list of users in stage 306. The signature or authorization may be required for completion of royalty disbursement.

The legal documents may also specify the ownership rights in derivative works. In various embodiments, the legal document generated may be a printed contract or a smart contract, a royalty agreement, a copyright registration form or document, and may be recorded on a ledger or blockchain. A smart contract may include rules which govern whether certain transactions occur (e.g., the generation of legal documents in response to changes in data files).

In some embodiments, the method 300 may further comprise detecting that a royalty payment associated with the data file has been made and automatically disbursing the royalty payment to each contributing user according to the relative copyright ownership or authorship represented in the legal document. The royalty and other payments may be facilitated by the financial transaction module.

Aspect 3

Figure 4:
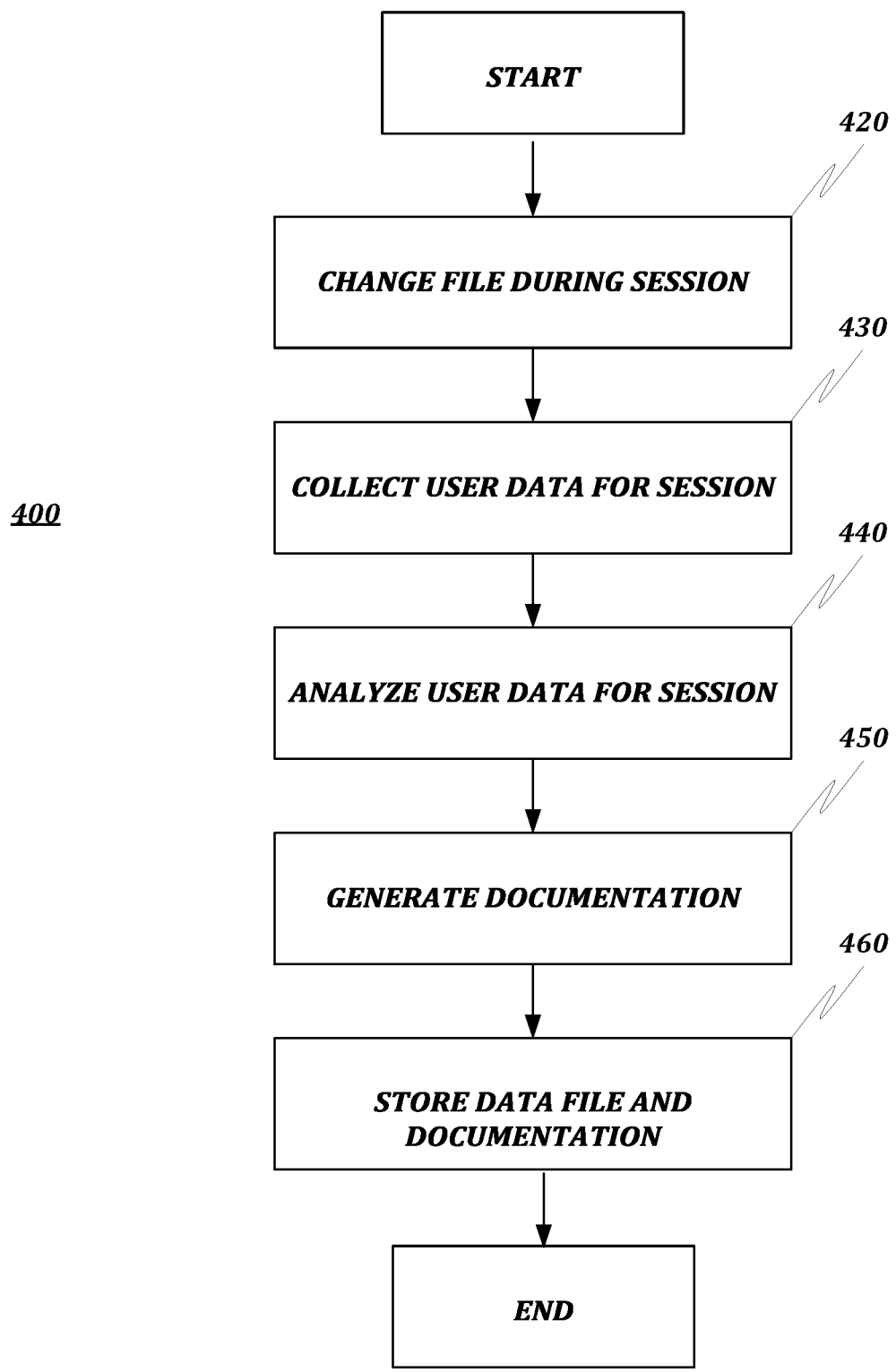
FIG. 4 is a flow chart of a method for providing blockchain tracking.

FIG. 4 is a flow chart setting forth the general stages involved in a method 400 consistent with an embodiment of the disclosure for providing authorship platform 100. Method 400 may be implemented using a computing device 900 or any other component associated with platform 100 as described in more detail below with respect to FIG. 8. For illustrative purposes alone, computing device 900 is described as one potential actor in the follow stages.

Method 400 may begin at starting block and proceed to stage 420 where computing device 900 may record one or more changes to a data file during a digital audio workstation session.

From stage 420, where computing device 900 records one or more changes, method 400 may advance to stage 430 where computing device 900 may collect user data during the digital audio workstation session. For example, the user data may comprise a log of any changes to the data file and the method may further comprise analyzing the log to produce the authorship data. The log of changes may contain the identity of the user which made the change to the data file, a timestamp of the change, and the change made to the work that is embodied in the data file. In various embodiments, the DAWs are equipped with permissions to determine whether one or more users can effect changes to authorship metadata and relative authorship values in response to changes to a data file. For example, if a new song has been completed, such as a master recording, permissions may be set such that unauthorized changes to a data file are prevented such that no changes are made to the authorship metadata and relative authorship values.

Moreover, each version of the data file may be stored "on-chain" or "off-chain" along with the authorship metadata and relative authorship values associated therewith and can be retrieved upon the execution of smart contracts.

Once computing device 900 collects the user data in stage 430, method 400 may continue to stage 440 where computing device 900 may analyze the user data to produce analytics. For example, a log of changes can be analyzed to determine the time a user spent making the contributions to the work stored in the data file, the degree of transformation to the work, etc. Furthermore, analyzing the user data may include sorting, aggregating, and summarizing the data in one or more legal agreements (e.g., publishing contract).

After computing device 900 analyzes the user data in stage 440, method 400 may proceed to stage 450 where computing device 900 may generate documentation containing the analytics. In some embodiments, a digital audio workstation incorporating modules of the authorship platform 100 as described herein may use one or more of the modules to generate and store, for example, the analytics documentation, data file, and/or associated metadata in a centralized or decentralized manner, e.g., on a blockchain.

After computing device 900 generates documentation in stage 450 of method 400, method 400 may proceed to stage 460 where computing device 900 stores the data file and/or the documentation. In various example embodiments, the analytics documentation and/or data file may be locally or remotely stored, in or on, for example, a ledger or blockchain. Once computing device 900 stores the data file and analytics documentation in stage 460, method 400 may then end at stage.

According to various embodiments, the method 400 may further comprise changing one or more portions of a data file during a plurality of digital audio workstation sessions to produce a plurality of session data files and, for each digital audio workstation session, collecting session user data during the digital audio workstation session; recording a session data file; analyzing the session user data to produce session analytics; generating associated session documentation containing the session analytics; and storing the session data file and associated session documentation for the digital audio workstation session. In some embodiments, each session data file and/or associated metadata may be stored on a ledger or blockchain. The metadata may contain the associated session documentation for the session data file.

In some embodiments, the method 400 may further comprise generating a hash value for the data file. In some embodiments, the hash value may be recorded in the analytics documentation. In some embodiments, a hash value may be generated for each DAW session of a plurality of DAW sessions. The hash values may then be recorded in the analytics documentation for each associated session. This may enable faster or more efficient processing, monitoring, version control, or validation of documentation associated with a data file.

Aspect 4

Figure 5:
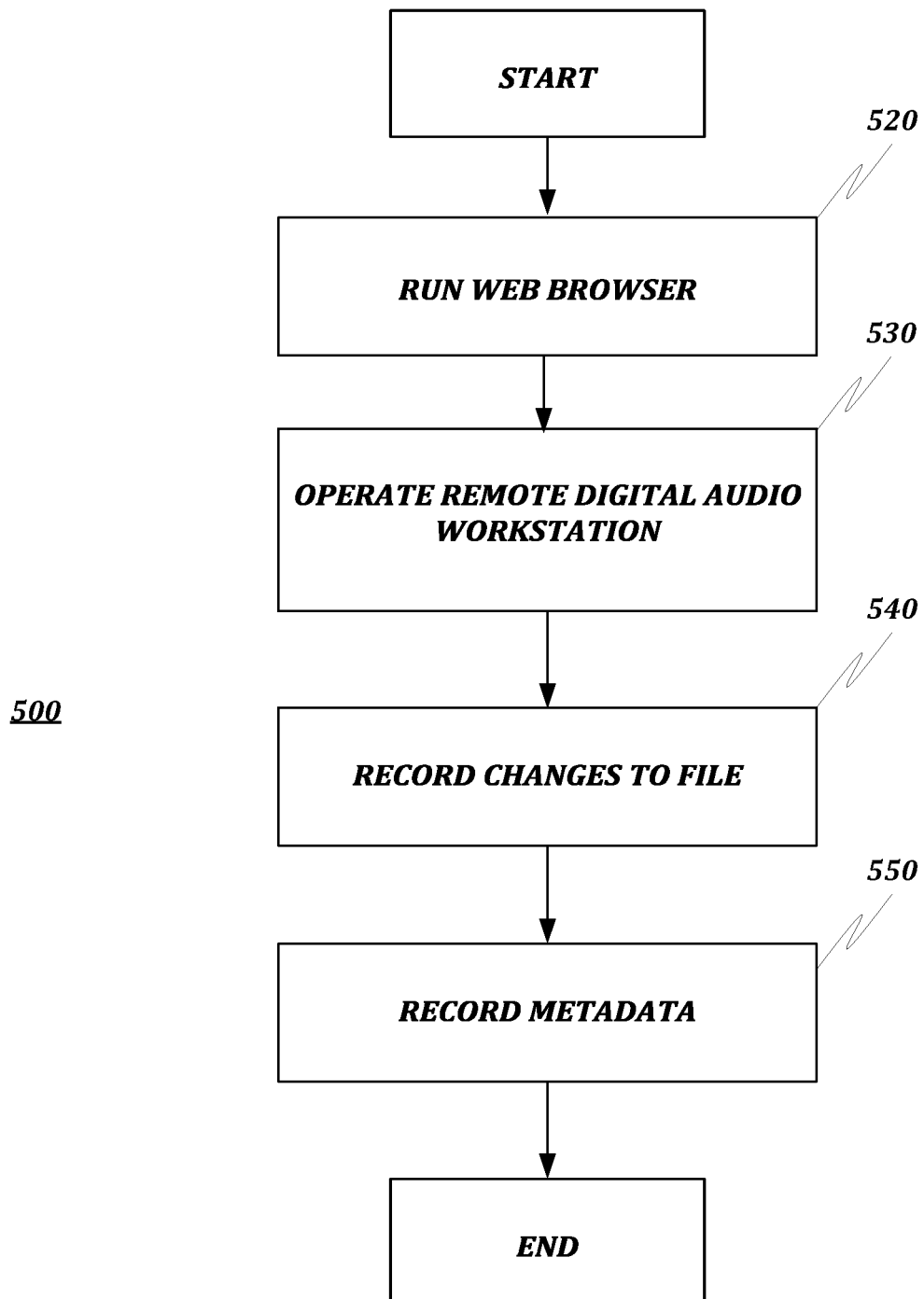
FIG. 5 is a flow chart of a method for providing digital audio workstation collaboration.

FIG. 5 is a flow chart setting forth the general stages involved in a method @00 consistent with an embodiment of the disclosure for providing authorship platform 100. Method 500 may be implemented using a computing device 900 or any other component associated with platform 100 as described in more detail below with respect to FIG. 8. For illustrative purposes alone, computing device 900 is described as one potential actor in the follow stages.

Method 500 may begin at starting block and proceed to stage 520 where computing device 900 may run a web browser. For example, a local computing device may run a web browser suitable for operating a web or cloud based digital audio workstation.

From stage 520, where computing device 900 runs the web browser, method 500 may advance to stage 530 where computing device 900 may operate a remote digital audio workstation using the web browser.

Once computing device 900 operates the digital audio workstation in stage 530, method 500 may continue to stage 540 where computing device 900 may record, in the remote digital audio workstation, changes to a data file.

After computing device 900 records changes to the data file in stage 540, method 400 may proceed to stage 550 where computing device 900 may record, in the remote digital audio workstation, metadata associated with the data file. For example, the authorship metadata associated with the user of the remote digital audio workstation may be stored in the cloud or in any storage associated with the remote digital audio workstation. In various embodiments, the metadata may be stored in an assigned local DAW (e.g., a network of shared DAWs). For example, once computing device 900 records the metadata in stage 550, method 500 may then end at stage.

According to various embodiments, the method 500 may further comprise running a plurality of web browsers on a plurality of computing devices. The plurality of web browsers may be used to operate one or more remote digital audio workstations during one or more DAW sessions. In various embodiments, one or more DAWs may facilitate the use by a plurality of users so long as they are authorized to operate the hardware and/or software to create or edit a work. The digital audio workstations may be used to make changes to a data file, such as recording parts of a song. Each change may be recorded in the associated digital audio workstation. The DAWs may have incorporated therein modules of the platform as disclosed herein. Accordingly, metadata associated with each session may be recorded in the respective DAW used to make changes to the data file. As previously described, when a plurality of DAWs are used concurrently to make changes to a data file, the collaborative module may be employed to prevent multiple change requests to the same segment(s) concurrently.

In some embodiments, one or more of the remote digital audio workstations may use resources of the computing device. For example, a web browser on a local computing device may access a DAW, and the DAW may access resources on the local computing device. Similarly, a plurality of devices may each be used to access DAWs, and the resources available on each device may be distributed among the devices. Further, decentralized or cloud-based computing devices, which may not belong to a specific user, may have resources partitioned therefrom by users of the platform 100. As such, computation offloading may be implemented to transfer resource-intensive computation tasks to a separate processor (e.g., hardware accelerator, or an external platform. Offloading computing to an external platform (e.g., cluster, grid, or cloud) over a network can provide computing power and overcome hardware limitations of a device, particularly, limited computational power, storage, and energy. In various embodiments, less resource-intensive tasks (e.g., storing authorship metadata) may be offloaded to a remote digital audio workstation. Resource-intensive tasks may be assigned to one or more local digital audio workstations.

Aspect 5

Figure 6:
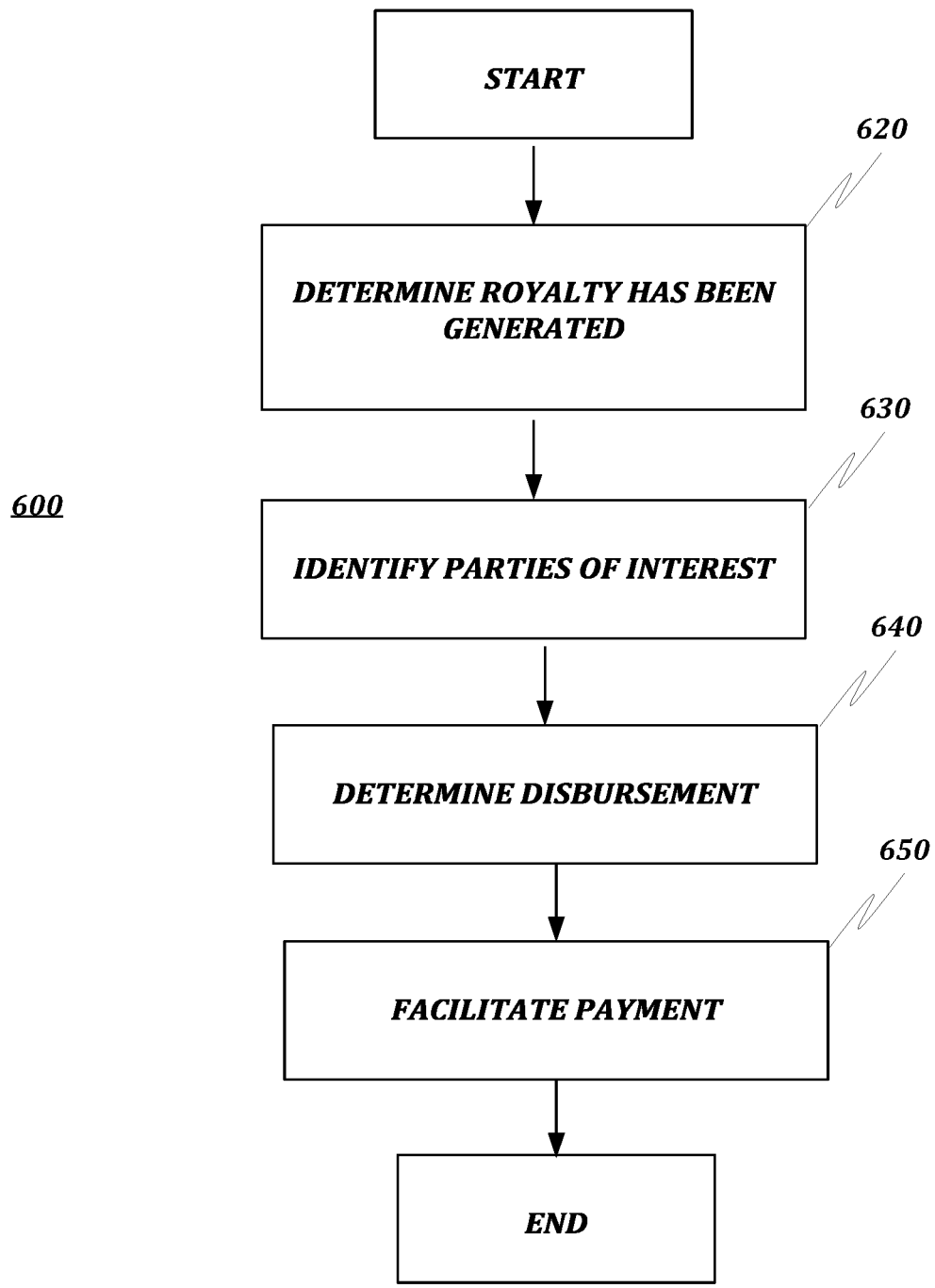
FIG. 6 is a flow chart of a method for providing a mechanical royalty calculation and disbursement.

FIG. 6 is a flow chart setting forth the general stages involved in a method 600 consistent with an embodiment of the disclosure for providing authorship platform 100. Method 600 may be implemented using a computing device 900 or any other component associated with platform 100 as described in more detail below with respect to FIG. 8. For illustrative purposes alone, computing device 900 is described as one potential actor in the follow stages.

Method 600 may begin at starting block and proceed to stage 620 where computing device 900 may determine that a plurality of authors of a work stored in a rendered media file are due a royalty payment. The rendered media file may have associated therewith metadata containing one or more relative authorship values for the plurality of authors.

From stage 620, where computing device 900 determines that a plurality of authors of a work stored in a rendered media file are due royalty payments, method 600 may advance to stage 630 where computing device 900 may, for each author of the plurality of authors, identify, from the metadata, a relative authorship value for the author.

Once computing device 900 determines the relative authorship value for each author in stage 630, method 600 may continue to stage 640 where computing device 900 may, for each author of the plurality of authors, determine a disbursement amount for the royalty payment according to the relative authorship value for each author. In some embodiments, one or more of the authors may use a digital audio workstation to make contributions to the data file. The digital audio workstations may contain user information related to authors. This user information may be used to facilitate disbursements for the authors. For example, user information in the DAW may include, inter alia, contact information, such as a name, phone number, email address, or physical address, bank account information, cryptowallet information, and other account information.

After computing device 900 determines a disbursement amount for each author in stage 640, method 600 may proceed to stage 650 where computing device 900 may, for each author of the plurality of authors, facilitate a payment of the disbursement amount for that author to the author. Once computing device 900 facilitates payment of the royalty in stage 650, method 600 may then end at stage.

According to some embodiments, the method 600 may further comprise parsing, from the metadata, the authorship values and automatically generating an enforceable legal document apportioning copyright ownership, authorship, or royalty rights in the work stored in the media file based on the parsed authorship values.

According to some embodiments, the method 600 may further comprise receiving an agreement to or authorization for, such as a signature, a smart contract, from each author. The agreement to the smart contract may comprise an agreement to an apportionment of copyright ownership, authorship, or royalty rights in a work stored in the media file. The rights or attribution of authorship may be based on the parsed authorship values. In various embodiments, an executed agreement by interested parties to a work stored in the media file may be stored as data within a smart contract. A change to the smart contract (e.g., a change in the relative authorship values) can change the state of the smart contract within an Ethereum framework.

In some embodiments, the method 600 may further comprise recording a change to the rendered media file made by a first user in a first digital audio workstation that results in a changed rendered media file. The change to the media file may then be evaluated to produce authorship data for the first user. The authorship data may then be recorded in the authorship metadata for the changed rendered media file. The method 600 may further comprise identifying a first relative authorship value for the first user from the metadata. A first disbursement amount may be calculated according to the first relative authorship value. The method 600 may also comprise facilitating a royalty payment of the first disbursement amount to the first user as described in more detail below.

Similarly, the method 600 may comprise recording a change to the rendered media file made by a plurality of users in one or more digital audio workstations that results in changed rendered media files. The changes to the media file may then be evaluated to produce authorship data for each user of the plurality of users. The authorship data may then be recorded in the metadata for the each changed rendered media file. The method 600 may further comprise identifying a plurality of relative authorships value for each user from the metadata. A plurality of disbursement amounts may be calculated according to the relative authorship values. The method 600 may also comprise facilitating payments of the plurality of royalty payments to one or more authors.

According to some embodiments, payments to a user or plurality of users of one or more DAWs may be automated using account information for a user account or plurality of user accounts belonging to the user or plurality of users of the one or more DAWs.

In yet other embodiments, the method 600 facilitates the payment of royalties within an Ethereum-blockchain framework. An Ethereum framework can facilitate decentralized transactions in a Turing-complete execution environment and therefore can perform any computation such as an algorithm. Smart contracts can be executed these computations, and for each transaction, a computation is executed within Ethereum.

In various embodiments, smart contracts can hold any arbitrary state and can perform any arbitrary computation. Advantageously, smart contracts can call other small contracts and can hold data.

For example, authorship metadata and the relative authorship values may be stored as data. For instance, during a DAW session, when the authorship metadata is updated due to changes to a data file, the state of one or more smart contract changes.

In various embodiments, the change in state of a first smart contract, which stores the authorship metadata, triggers a second smart contract which stores the data associated with the relative authorship values of each author listed in the authorship metadata.

A third smart contract can store data associated with an account used to make royalty payments. In various embodiments, the third smart contract initiates royalty payments in the form of an ether (or other suitable cryptocurrency) to an account owned by the authors (copyright holders, etc.), subject to a set of rules, conditions, or events that algorithmically or mechanically determine when the third smart contract is executed and under which terms, listed in the authorship metadata.

It should be understood by one having ordinary skill in the art that the use of a first, second, and third smart contract is exemplary and not intended to be an exhaustive manner of carrying out the method 600 in the present disclosure. As such, one or more smart contracts may be used to update authorship metadata stored "on-chain," to update the relative authorship values in response to the change, and facilitate a royalty payment.

In various embodiments, a performance of a work (e.g., playing or streaming a song) that is stored in a data file may trigger royalty payments to authors, copyright holders, etc. that are listed in the authorship metadata associated with the performed work. For example, a digital media file may be configured to be read within an Ethereum blockchain framework. Accordingly, a stream of a song may lead to the disbursement of royalty payments according to a set of rules, conditions, or events.

In yet other implementations, payment for the performance of a work is gating to playing or streaming a song that is stored in a digital media file. For example, if an entity, such as a radio station, desires to play a song, the radio station must pay the required fee according to a pay-for-play model through a personal wallet to affect a mechanical royalty payment.

Figure 7:
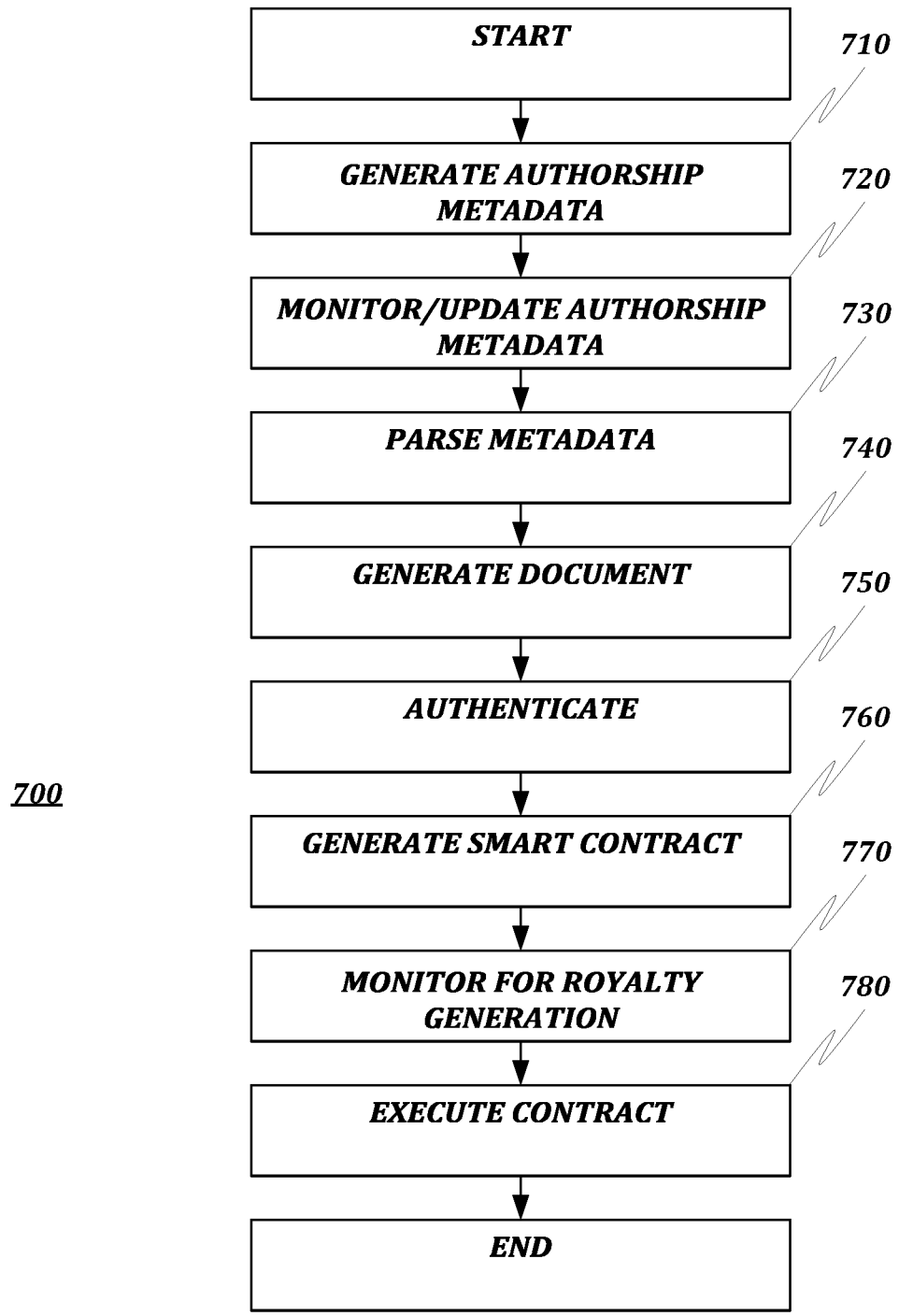
FIG. 7 is a flow chart depicting stages for generation and execution of a smart contract according to some embodiments.

FIG. 7 depicts stages of a method for generation and execution of a smart contract according to some embodiments of the present disclosure. FIG. 7 is a flow chart setting forth the general stages involved in a method 700 consistent with an embodiment of the disclosure for providing authorship platform 100. Method 700 may be implemented using a computing device 900 or any other component associated with platform 100 as described in more detail below with respect to FIG. 8. For illustrative purposes alone, computing device 900 is described as one potential actor in the follow stages.

Method 700 may begin at starting block and proceed to stage 710 where computing device 900 may generate authorship metadata for a media file.

From stage 710, where computing device 900 generates authorship metadata, method 700 may advance to stage 720 where computing device 900 may monitor or update the authorship metadata. For example, computing device 900 may update the metadata in response to the data file being changed. As another example, computing device 900 may monitor authorship data to trigger a change in the terms of a smart contract.

Once computing device 900 monitors or updates the metadata in stage 720, method 700 may continue to stage 730 where computing device 900 may parse the metadata into terms. For example, by extracting users and authorship values or percentages from authorship metadata.

After computing device 900 parses the metadata in stage 730, method 700 may proceed to stage 740 where computing device 900 may generate a document or documentation containing an arrangement of terms parsed from the metadata. For example, a metadata protocol module as disclosed herein may parse terms and provide them to a document generation module.

Once computing device 900 generates a document or documentation in stage 740, method 700 may proceed to stage 750 where the document or documentation may be authenticated by the authentication module, such as by being processed for signature, e-signature, or other validation.

Once computing device 900 authenticates the document or documentation in stage 750, the method 700 may proceed to stage 760 where a smart contract module may generate a smart contract incorporating the authenticated or signed document or documentation.

From stage 760 where the computing device 900 generates a smart contract, method 700 may proceed to stage 770 where the computing device 900 may monitor for generation of a royalty from the media file. For example, royalty events may be recorded in a datastore, local, remote, decentralized, or other. In some embodiments, such datastores may be monitored, for example, by a network communication module as disclosed herein.

From stage 770 where the computing device 900 monitors for royalty generation, method 700 may proceed to stage 780 where a contract may be executed. For example, a smart contract may be mechanically executed according to terms algorithmically derived from authorship metadata hosted on a ledger or blockchain. In some embodiments, the financial transaction module may automatically process or generate payments according to terms of the smart contract. For example, the computing device 900 may initiate and facilitate an electronic money transfer, printing and mailing of a check or cryptowallet, or other financial transaction. From stage 780 where the contract is executed, method 700 may end at ending block.

Figure 8:
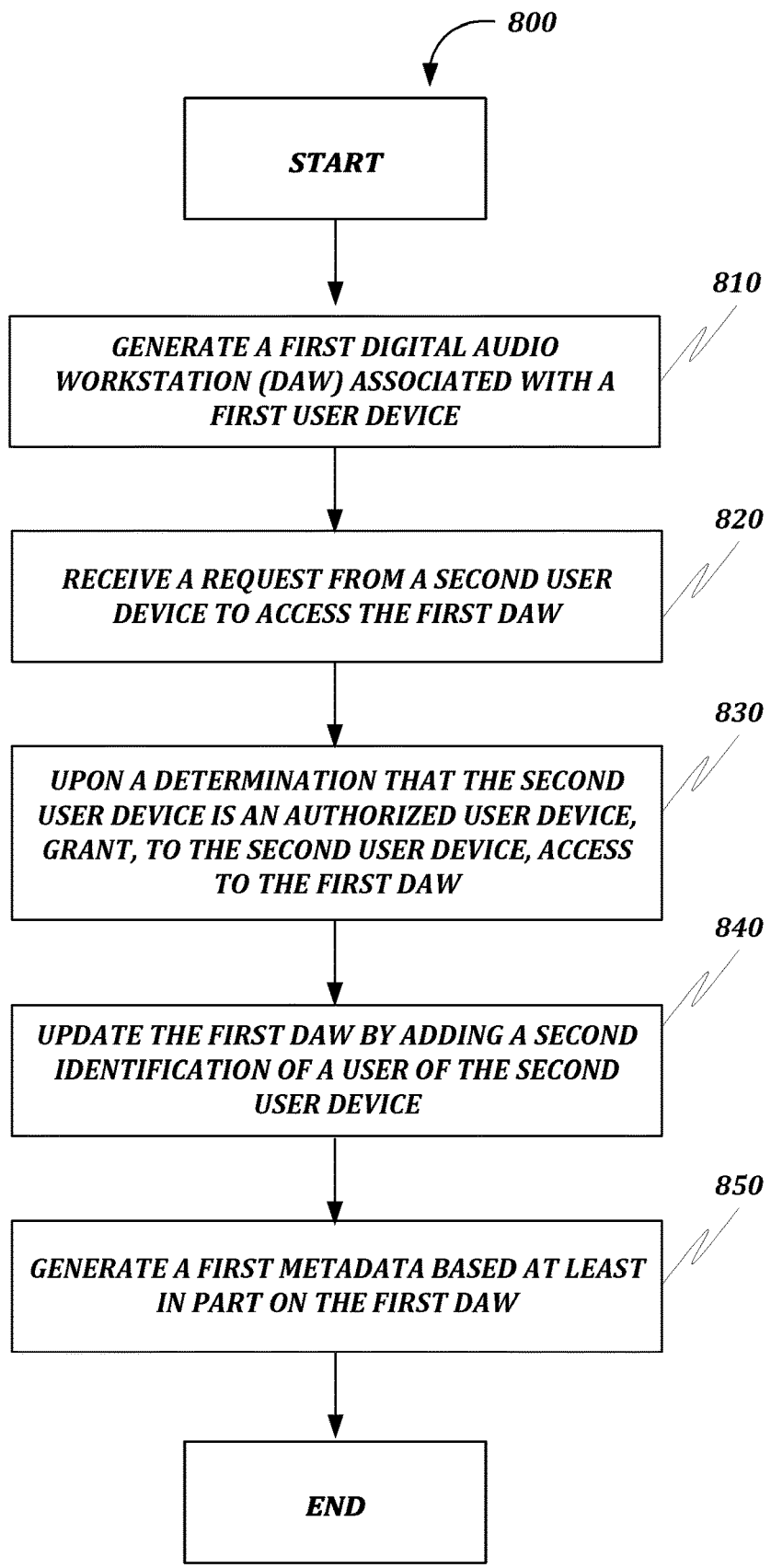
FIG. 8 is a flow chart of a method for providing a synchronized digital audio workstation.

Referring now to FIG. 8, method 800 may begin at starting block stage 810 where computing device 900 may generate a first DAW associated with a first user device. For example, the first DAW may include a personal identification of the user of the user device and an audio data file. The personal identification may include a user's name, address, SSN, or any suitable identification that can be used to determine identity of the user.

From stage 810, where computing device 900 generate the first DAW associated with the user device, method 800 may advance to stage 820 where computing device 900 may receive a request from a second user device to access the first DAW. The request from the second user device may be received from an API layer of the second user device, in the collaboration module, or from a software application running on the second user device's web browser.

Once computing device 900 receives the request from the second user device in stage 820, method 800 may continue to stage 830 where computing device 900 may, upon a determination that the second used device is an authorized device, grant, to the second device, access to the first DAW. The authorized second user may access a copy of the first DAW on his local computing device (i.e., on his PC, laptop, smartphone). Alternatively, the authorized second user may access an online copy of the first DAW shared with him by a cloud server.

Once computing device 900 grants to the second user device access to the first DAW in stage 830, method 800 may continue to stage 840 where computing device 900 may update the first DAW by adding an identification of the user of the second user device.

Once computing device 900 updates the first DAW by adding the identification of the user of the user device in stage 840, method 800 may end at stage 850 where computing device 900 may generate a first metadata based on the first DAW. For example, the first metadata includes a first contribution value by the user to the audio data file and a second contribution value by the second user to the audio data file.

FIGS. 10A-10K, are flowcharts setting forth the general stages involved in methods 1000A-1000K consistent with embodiments of the disclosure for providing synchronized platform 100. Methods 200A-200K may be implemented using a computing device 900 or any other component associated with platform 100 as described in more detail below with respect to FIG. 1 and FIG. 9. For illustrative purposes alone, computing device 900 is described as one potential actor in the follow stages.

Method 1000A may begin at starting stage 1002 where computing device 900 may obtain a first DAW from a first user device. For example, the first DAW may include a personal identification of the user of the user device and an audio data file. A DAW is a software application which users (i.e., artists, songwriters, musicians) employ to create, revise and modify audio data files (i.e., songs, music compositions). The personal identification may include name, address, SSN, or any suitable identification that can be used to determine identity of the user. The first DAW may be a software running and being stored on a local computing device (i.e., laptop, PC, smartphone, etc.), or a software running online and being stored on a remote cloud server. As another example, the first DAW is an application running on a web browser on the user device.

From stage 1002, where computing device 900 obtaining the first DAW from the user device, method 1000A may advance to stage 1004 where computing device 900 may determine whether the user of the user device is an authorized user. To that end, any suitable authorization method known in the art can be used. If the user is determined as an unauthorized user, then the user is not allowed to access to modify or revise the first DAW and the first DAW may be discarded.

Once computing device 900 determines whether the user of the user device is authorized user, in stage 1004, method 1000A may continue to stage 1006 where computing device 900 may generate a first metadata based on the first DAW. For example, the first metadata includes a first contribution value by the user to the audio data file. A contribution value indicates how the user contributed to creating DAW (i.e., what percentage of the song is a result of his work).

Figure 10A:
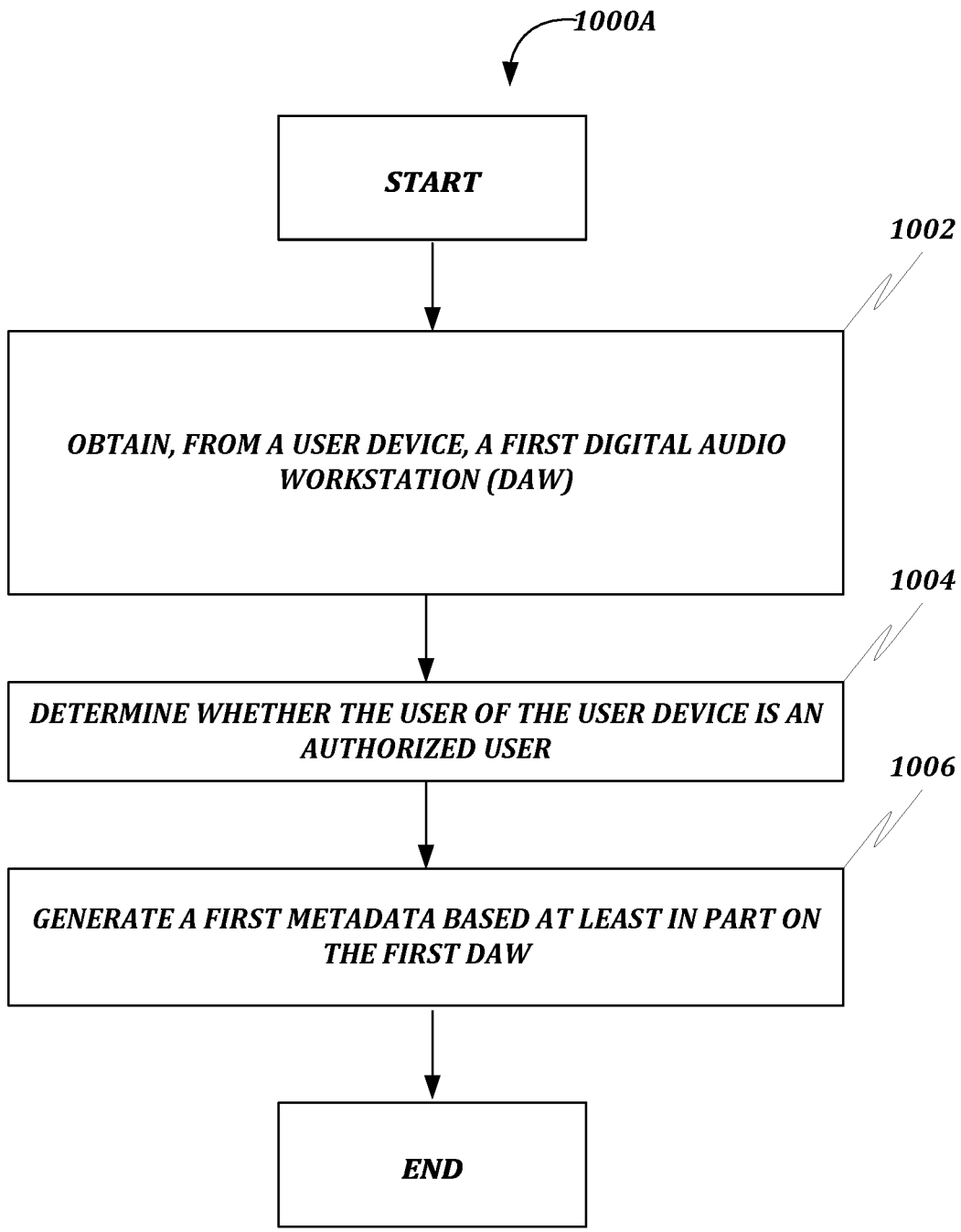
FIGS. 10A-10K are flowcharts of methods for providing synchronized digital audio workstation.
Figure 10B:
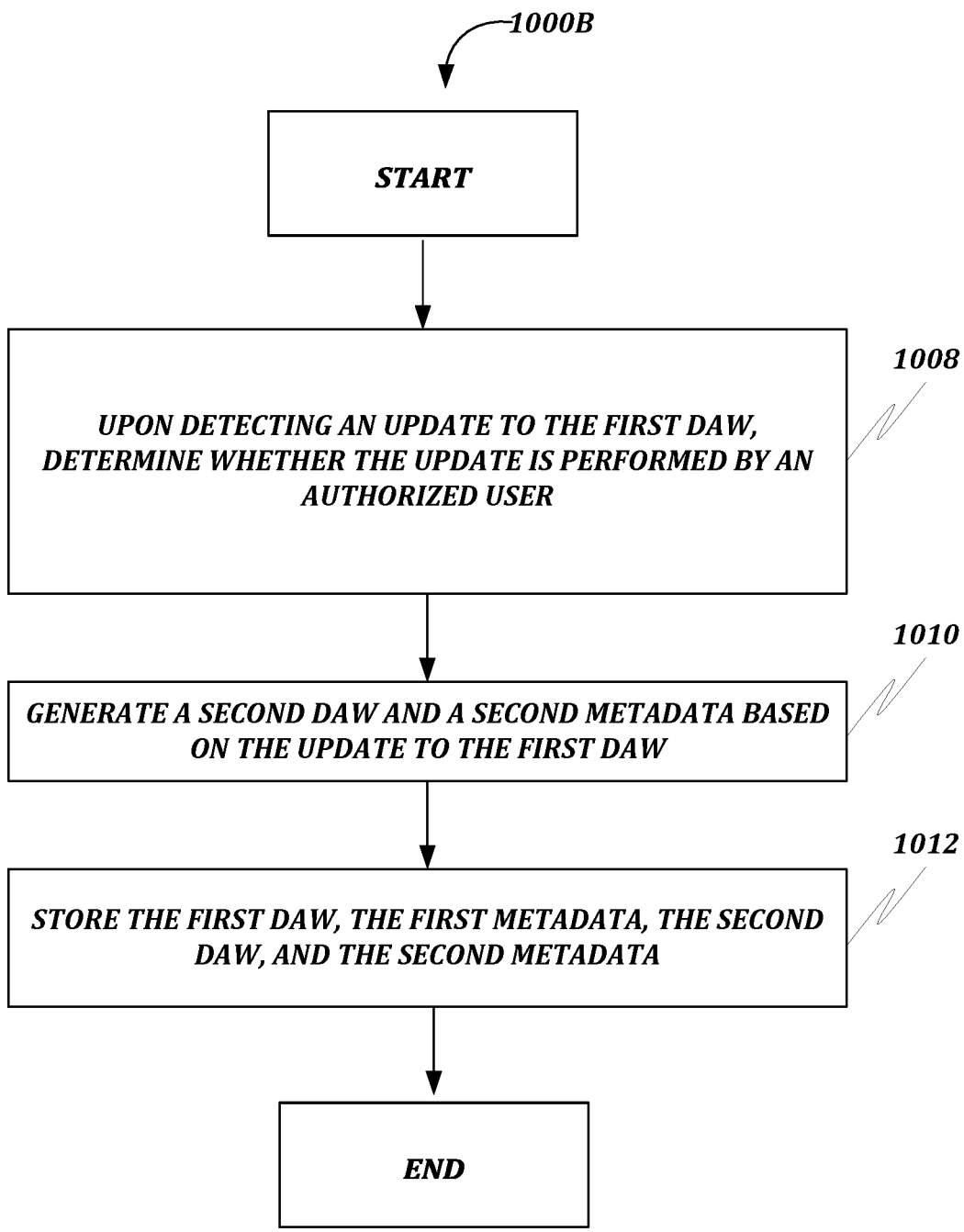

As illustrated in FIG. 10B, after computing device 900 generates the first metadata based on the first DAW in stage 1006, method 1000B may proceed to stage 1008 where computing device 900 may upon detecting an update to the first DAW, determine whether the update is performed by an authorized user. Any suitable authorization method known in the art can be used. If the user is determined as an unauthorized user, then update to the first DAW is discarded.

Once computing device 900 determines whether the update is performed by an authorized user, in stage 1008, method 1000B may continue to stage 1010 where computing device 900 may generate a second DAW and a second metadata associated with the second DAW. For example, the second DAW is a software running on the user device or a software running on a web browser on the user device. That is, the second DAW may be a software running and being stored on the local computing device, or a software running online and being stored on the remote cloud server. The second DAW and its associated metadata (i.e., the second metadata) are generated based on the first DAW.

Once computing device 900 generates the second DAW and the second metadata in stage 1010, method 1000B may then end at stage 1012 wherein the computing device 900 may store the first DAW, the first metadata, the second DAW, and the second metadata.

Figure 10C:
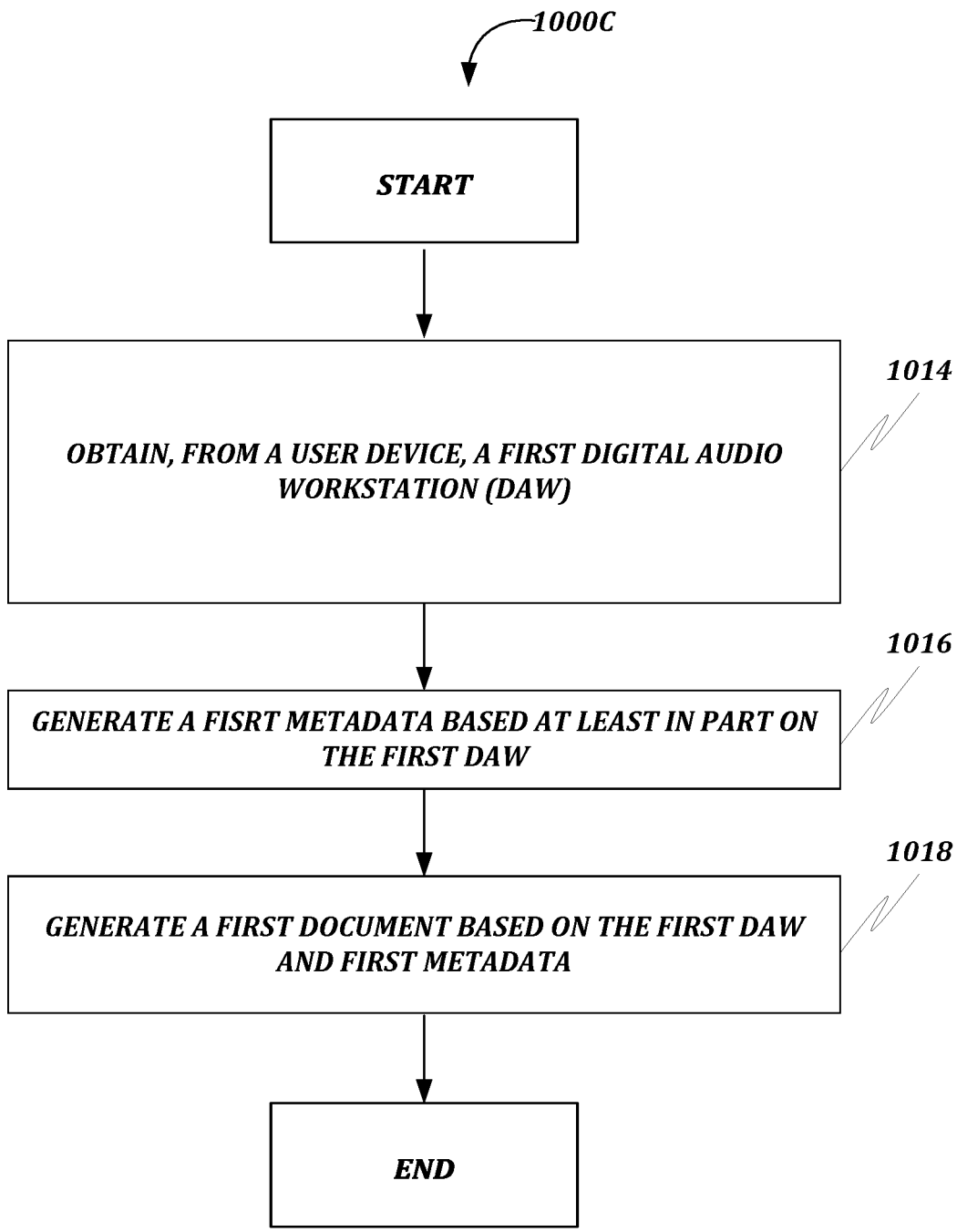

Referring now to FIG. 10C, method 1000C may begin at starting stage 1014 where computing device 900 may obtain a first DAW from a first user device. For example, the first DAW may include a personal identification of the user of the user device and an audio data file. A DAW is a software application which users (i.e., artists, songwriters, musicians) employ to create, revise and modify audio data files (i.e., songs, music compositions). The personal identification may include name, address, SSN, or any suitable identification that can be used to determine identity of the user. The first DAW may be a software running and being stored on a local computing device (i.e., laptop, PC, smartphone, etc.), or a software running online and being stored on a remote cloud server. As another example, the first DAW is an application running on a web browser on the user device.

From stage 1014, where computing device 900 obtains the first DAW from the user device, method 1000C may advance to stage 1016 where computing device 900 may generate a first metadata based on the first DAW. For example, the first metadata includes a first contribution value by the user to the audio data file. A contribution value indicates how the user contributed to creating DAW (i.e., what percentage of the song is a result of his work).

Once computing device 900 generates the first metadata in stage 1016, method 1000C may continue to stage 1018 where computing device 900 may generate a first document based on the first DAW and the first metadata. For example, the first document may include information about copyrights of the audio data file (i.e., copyrights information of the song). The first document may be a legal document that can be used to determine each user's copyrights and shares of royalty.

Figure 10D:
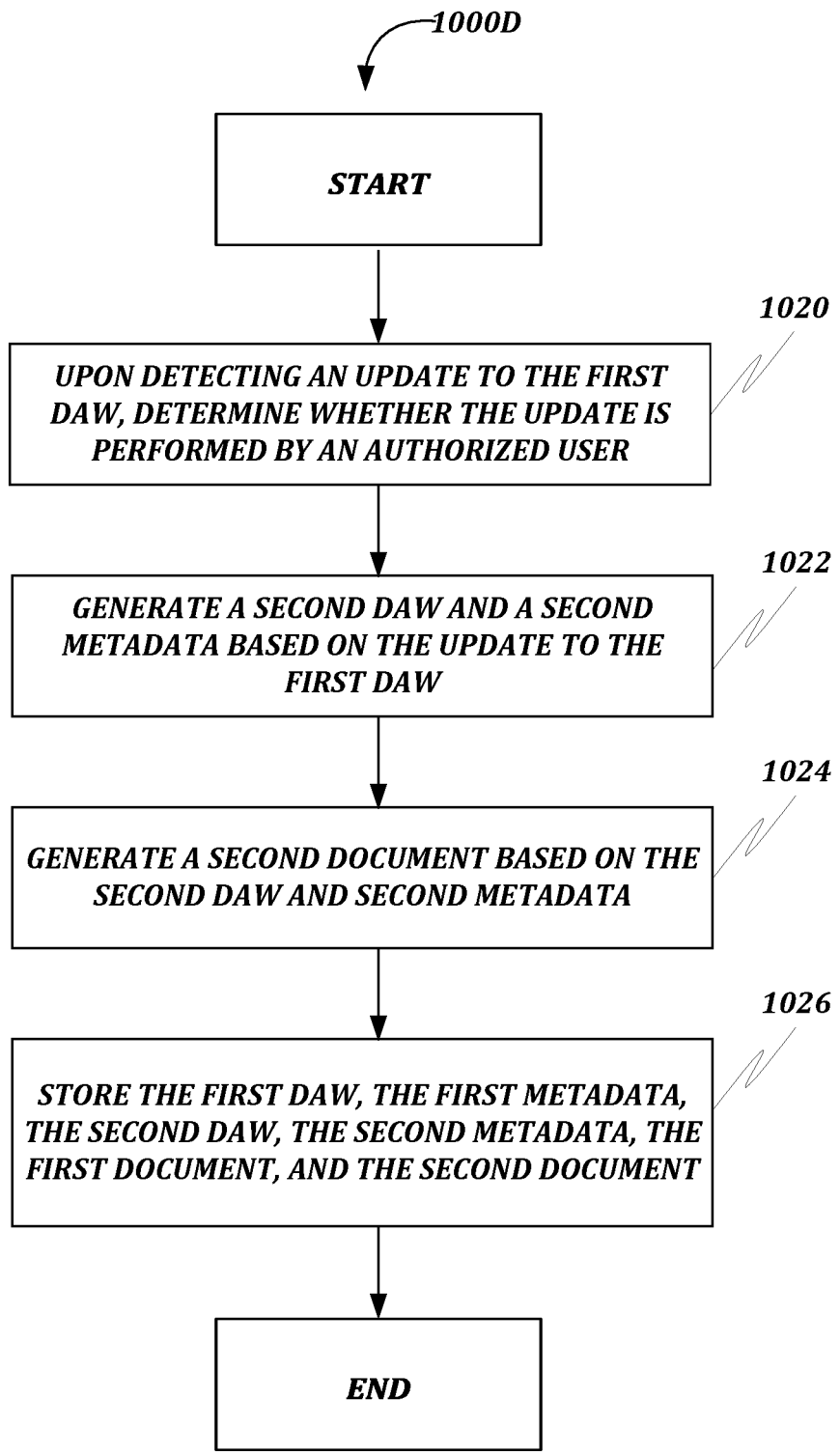

As illustrated in FIG. 10D, after computing device 900 generates the first document based on the first DAW and the first metadata in stage 1018, method 1000D may proceed to stage 1020 where computing device 900 may upon detecting an update to the first DAW, determine whether the update is performed by an authorized user. Any suitable authorization method known in the art can be used. If the user is determined as an unauthorized user, then update to the first DAW is discarded.

Once computing device 900 determines whether the update is performed by an authorized user, in stage 1020, method 1000D may continue to stage 1022 where computing device 900 may generate a second DAW and a second metadata associated with the second DAW. For example, the second DAW is a software running on the user device or a software running on a web browser on the user device. That is, the second DAW may be a software running and being stored on the local computing device, or a software running online and being stored on the remote cloud server. The second DAW and its associated metadata (i.e., the second metadata) are generated based on the first DAW.

Once computing device 900 generates the second DAW and the second metadata in stage 1022, method 1000D may continue to stage 1024 where computing device 900 may generate a second document based on the second DAW and the second metadata. For example, the second document may include information about copyrights of the second DAW (i.e., copyrights information of the song). The second document may be a legal document that can be used to determine each user's copyrights and shares of royalty.

Once computing device 900 generates the second document in stage 1024, method 1000D may then end at stage 1026 wherein the computing device 900 may store the first DAW, the first metadata, the second DAW, the second metadata, the first document, and the second document.

Figure 10E:
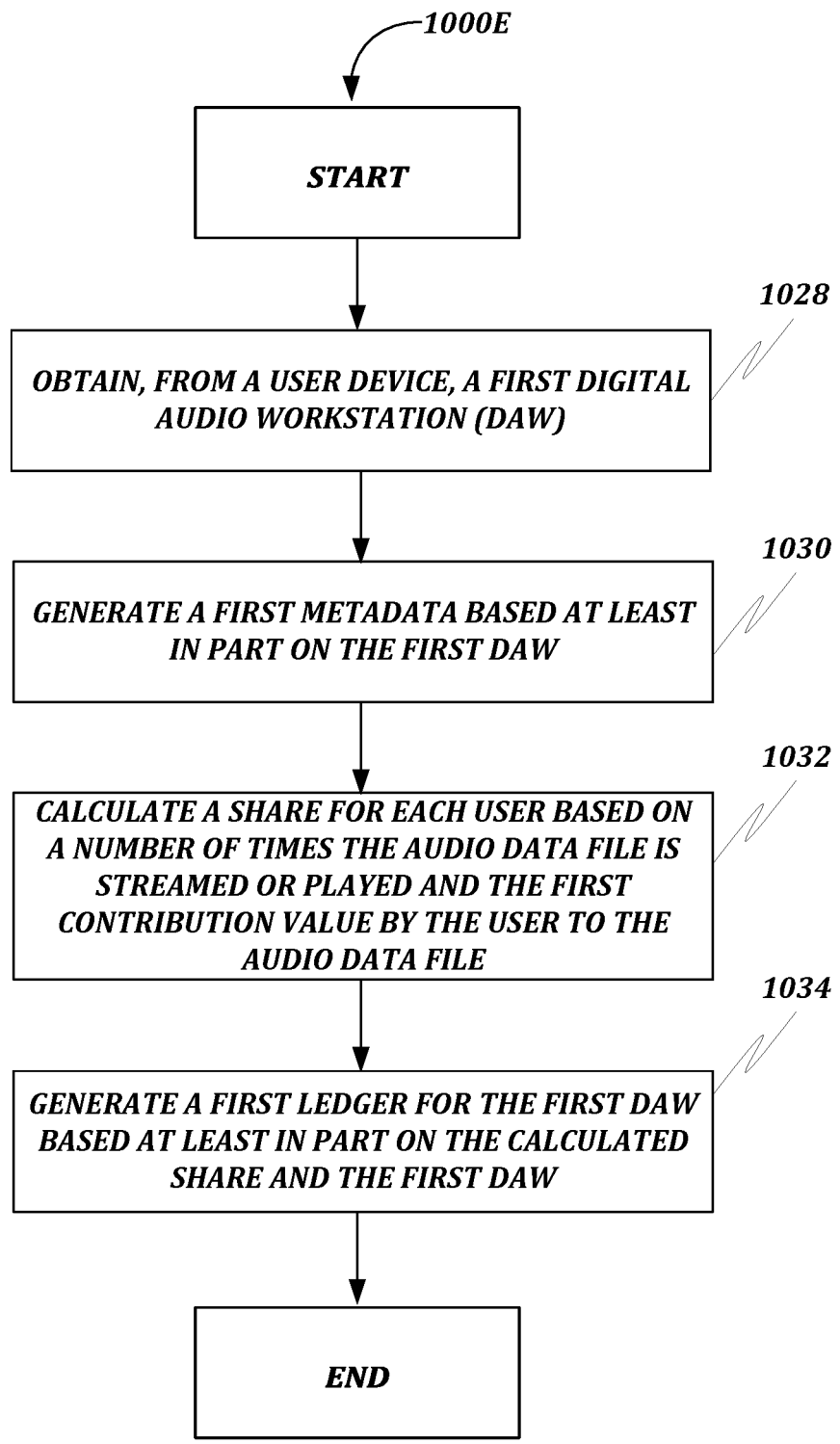

Referring now to FIG. 10E, method 1000E may begin at starting stage 1028 where computing device 900 may obtain a first DAW from a first user device. For example, the first DAW may include a personal identification of the user of the user device and an audio data file. A DAW is a software application which users (i.e., artists, songwriters, musicians) employ to create, revise and modify audio data files (i.e., songs, music compositions). The first DAW may be shared by two or more user device. The personal identification may include name, address, SSN, or any suitable identification that can be used to determine identity of the user. The first DAW may be a software running and being stored on a local computing device (i.e., laptop, PC, smartphone, etc.), or a software running online and being stored on a remote cloud server. As another example, the first DAW is an application running on a web browser on the user device.

From stage 1028, where computing device 900 obtains the first DAW from the user device, method 1000E may advance to stage 1030 where computing device 900 may generate a first metadata based on the first DAW. For example, the first metadata includes a first contribution value by the user to the audio data file. A contribution value indicates how the user contributed to creating DAW (i.e., what percentage of the song is a result of his work).

Once computing device 900 generates the first metadata in stage 1030, method 1000E may continue to stage 1032 where computing device 900 may calculate a share for the user based on a number of times the audio data file (i.e., the song) is streamed or played and the first contribution value by the user to the audio data file.

Once computing device 900 calculates a share for the user in stage 1032, method 1000E may continue to stage 1034 where computing device 900 may generate a first ledger for the first DAW based on the calculated share. For example, the first ledger may include a data file including information about royalties measured based on the number of times the song is streamed or played. The user's share of royalty can be calculated and stored on the first ledger.

Figure 10F:
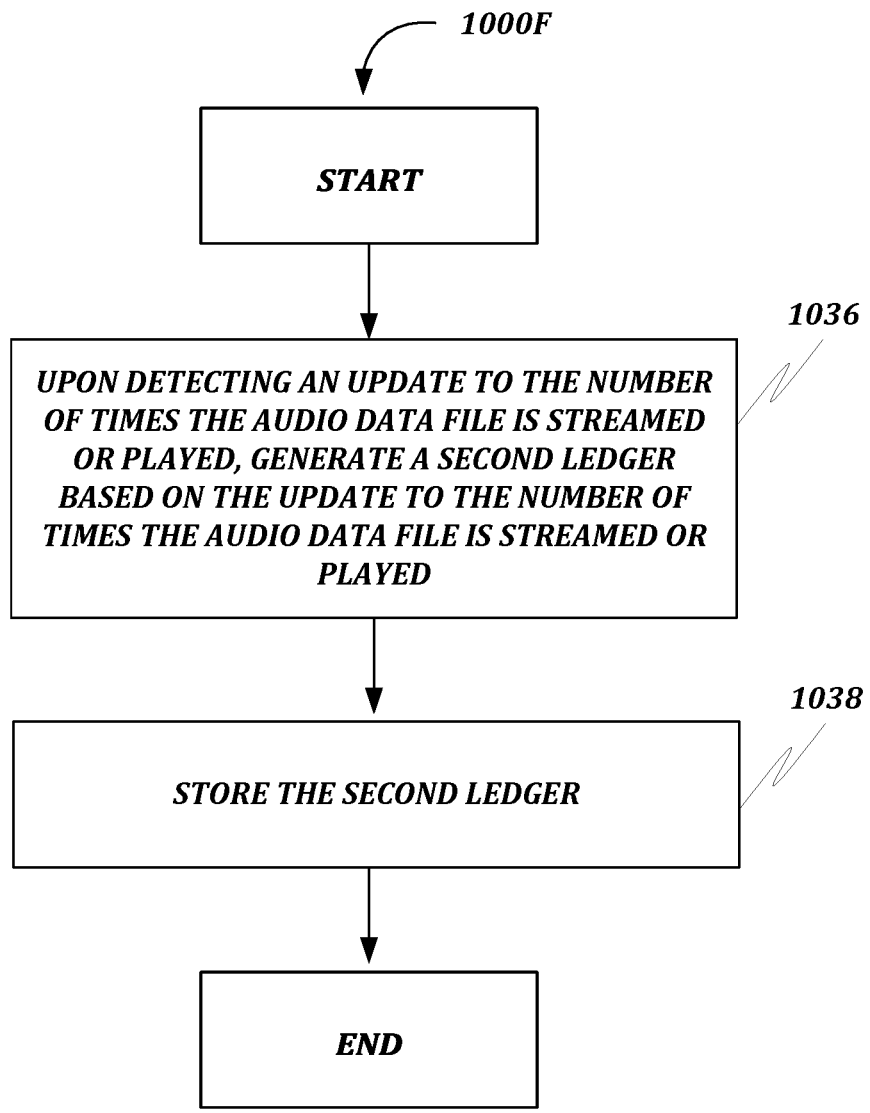

Referring to FIG. 10F, method 1000F may begin at starting stage 1036 where computing device 900 may, upon detecting an update to the number of times the song is streamed or played, generate a second ledger based on the update to the number of times the audio data file is streamed or played.

Once computing device 900 generates the second ledger in stage 1036, method 1000F may then end at stage 1038 where computing device 900 may store the second ledger.

Figure 10G:
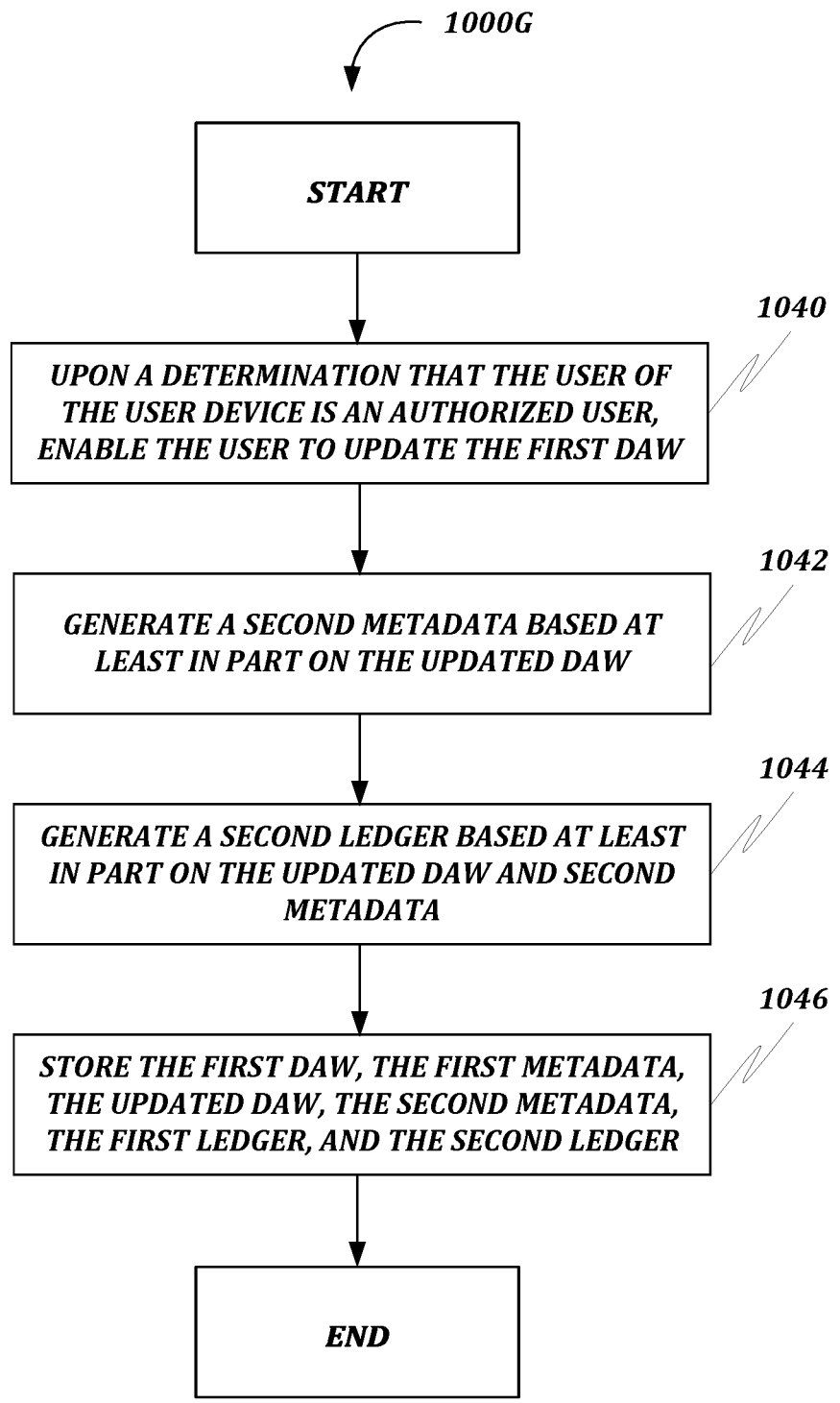

Referring to FIG. 10G, method 1000G may begin at starting stage 1040 where computing device 900 may upon a determination that the user of the user device is an authorized user, enable the user to update the first DAW. Any suitable authorization method known in the art can be used. If the user is determined as an unauthorized user, then update to the first DAW is discarded.

Once computing device 900 enables the user to update the first DAW in stage 1040, method 1000G may continue to stage 1042 where computing device 900 may generate a second metadata based on the updated DAW. For example, the second metadata includes a second contribution value by the user to the audio data file.

Once computing device 900 generates the second metadata in stage 1042, method 1000G may continue to stage 1044 where computing device 900 may generate a second ledger based on the updated DAW and the second metadata. For example, the second ledger may include a data file including information about royalties measured based on the updated DAW. The user's share of royalty can be calculated and stored on the second ledger.

Once computing device 900 generates the second ledger in stage 1044, method 1000G may then end at stage 1046 wherein the computing device 900 may store the first DAW, the first metadata, the updated DAW, the second metadata, the first ledger, and the second ledger. For example, the first DAW, the first metadata, the updated DAW, and the second metadata can be retrieved from either first ledger or the second ledger.

Figure 10H:
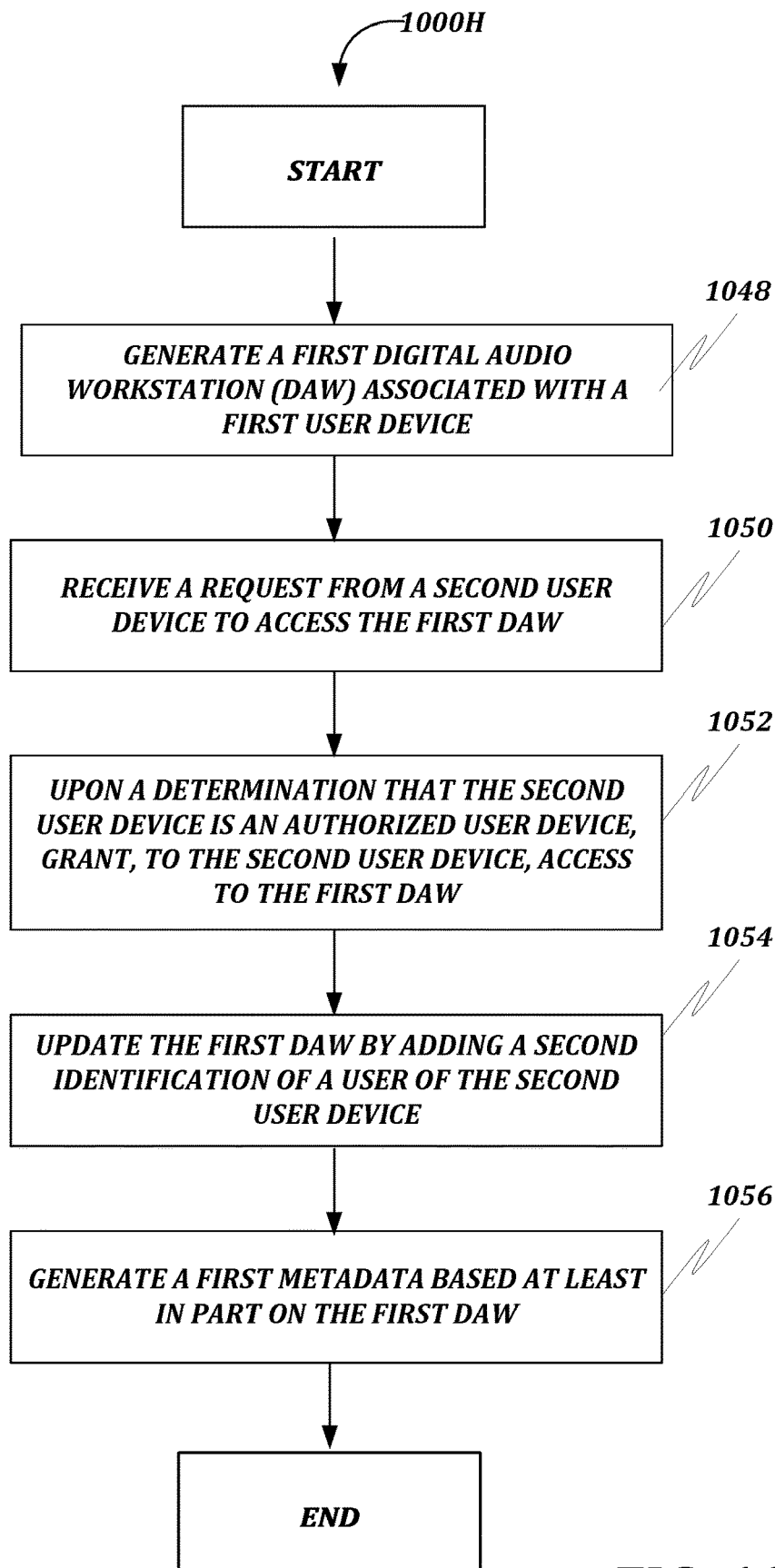

Referring now to FIG. 10H, method 1000H may begin at starting block stage 1048 where computing device 900 may generate a first DAW associated with a first user device. For example, the first DAW may include a personal identification of the user of the user device and an audio data file. A DAW is a software application which users (i.e., artists, songwriters, musicians) employ to create, revise and modify audio data files (i.e., songs, music compositions). The personal identification may include name, address, SSN, or any suitable identification that can be used to determine identity of the user. The first DAW may be a software running and being stored on a local computing device (i.e., laptop, PC, smartphone, etc.), or a software running online and being stored on a remote cloud server. As another example, the first DAW is an application running on a web browser on the user device.

From stage 1048, where computing device 900 generate the first DAW associated with the user device, method 1000H may advance to stage 1050 where computing device 900 may receive a request from a second user device to access the first DAW. The request from the second user device may be received from an API layer of the second user device, or from an application running on second user device's web browser.

Once computing device 900 receives the request from the second user device in stage 1050, method 1000H may continue to stage 1052 where computing device 900 may, upon a determination that the second used device is an authorized device, grant, to the second device, access to the first DAW. The authorized second user may access a copy of the first DAW on his local computing device (i.e., on his PC, laptop, smartphone). Alternatively, the authorized second user may access an online copy of the first DAW shared with him by a cloud server.

Once computing device 900 grants to the second user device access to the first DAW in stage 1052, method 1000H may continue to stage 2=1054 where computing device 900 may update the first DAW by adding an identification of the user of the second user device. The personal identification may include name, address, SSN, or any suitable identification that can be used to determine identity of the user of the second user device.

Once computing device 900 updates the first DAW by adding the identification of the user of the user device in stage 1054, method 1000H may end at stage 1056 where computing device 900 may generate a first metadata based on the first DAW. For example, the first metadata includes a first contribution value by the user to the audio data file and a second contribution value by the second user to the audio data file. A contribution value indicates how the user contributed to creating DAW (i.e., what percentage of the song is a result of his work).

Figure 10I:
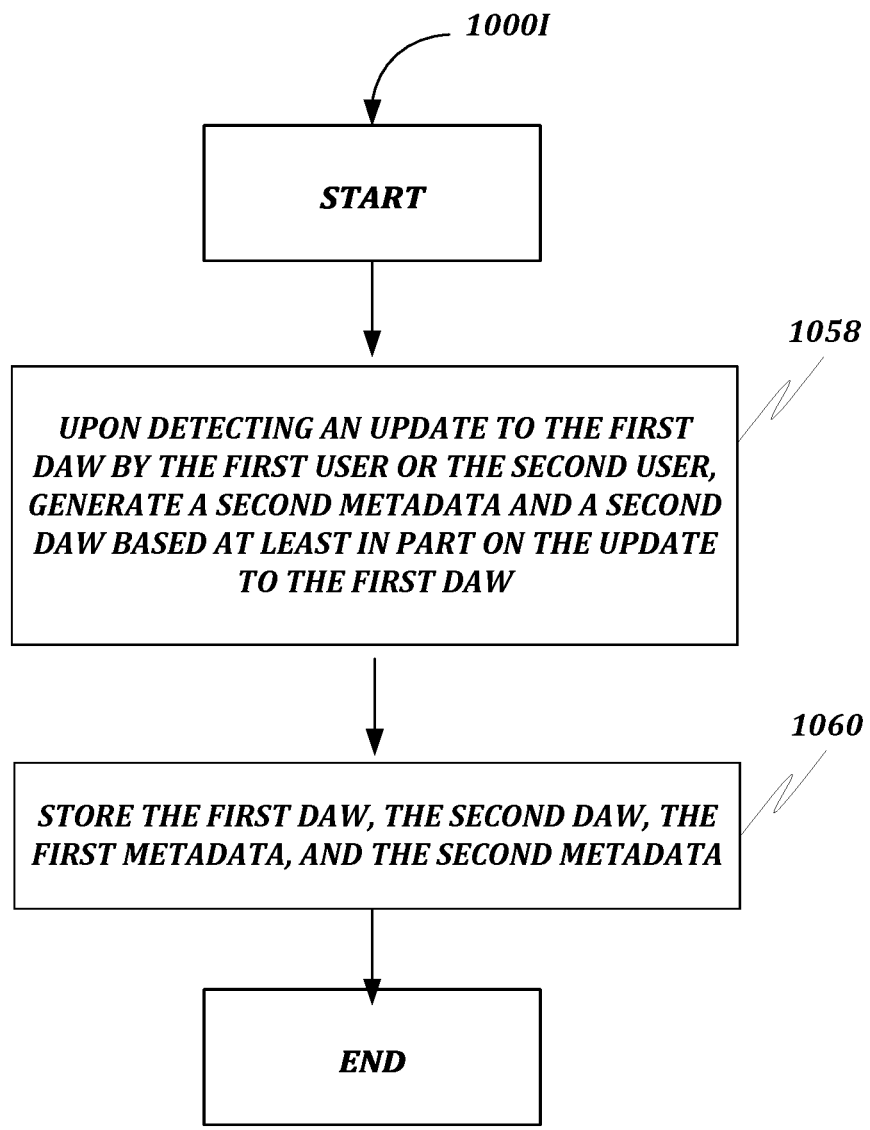

Referring now to FIG. 10I, method 1000I may begin at starting stage 1058 where computing device 900 may, upon detecting an update to the first DAW by the first user or the second user, generates a second metadata and a second DAW based on the update to the first DAW. For example, the second metadata includes an updated contribution value by the first user to the audio data file and an update contribution value by the second user to the audio data file. This ensures that while the users are updating the DAW (i.e., while the songwriters are modifying the song), DAW and its associated metadata including each user's contribution is constantly updated to reflect the most recent DAW and contribution values.

Once computing device 900 generates the second metadata in stage 1058, method 1000I may then end at stage 1060 wherein the computing device 900 may store the first DAW, the first metadata, the second DAW, and the second metadata. For example, the first DAW is stored locally on the first user device. For example, the second DAW is stored remotely on a cloud server and is shared with the authorized user's user devices. In some embodiments, generating the second DAW and the second metadata are performed in real-time. In some embodiments, the first DAW and the second DAW are in communication with each other. The communication may be in real-time or at pre-defined time intervals. (i.e., each 10 seconds, each 1 minute, every hour, every other day, etc.).

Figure 10J:
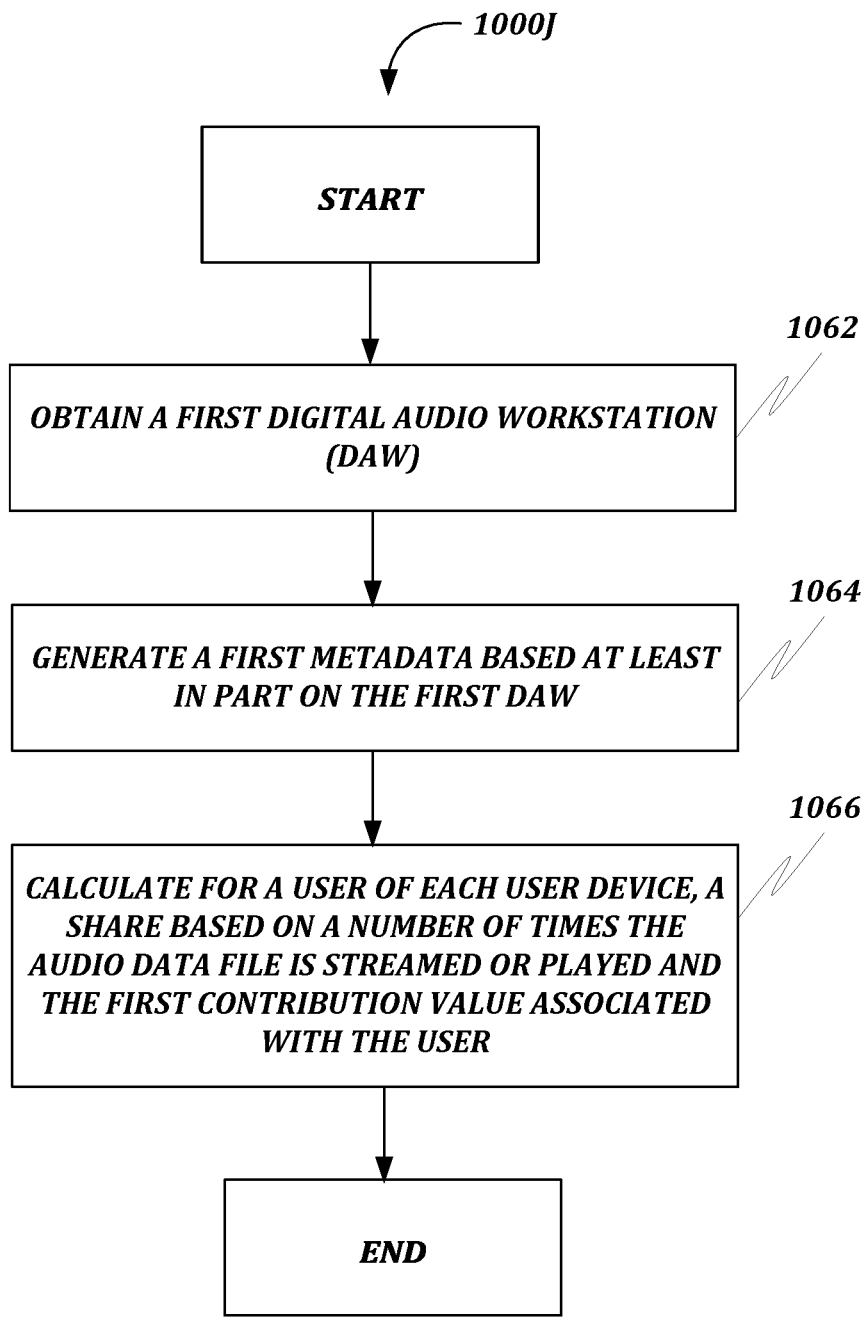

Referring now to FIG. 10J, method 1000J may begin at starting stage 1062 where computing device 900 may obtain a first DAW. For example, the first DAW may include a personal identification of each user of the user device and an audio data file. A DAW is a software application which users (i.e., artists, songwriters, musicians) employ to create, revise and modify audio data files (i.e., songs, music compositions). The personal identification may include name, address, SSN, or any suitable identification that can be used to determine identity of the user. The first DAW may be a software running and being stored on a local computing device (i.e., laptop, PC, smartphone, etc.), or a software running online and being stored on a remote cloud server. As another example, the first DAW is an application running on a web browser on the user device.

From stage 1062, where computing device 900 obtains the first DAW, method 1000J may advance to stage 1064 where computing device 900 may generate a first metadata based on the first DAW. For example, the first metadata includes a first contribution value by the user of each user device to the audio data file. A contribution value indicates how the user contributed to creating DAW (i.e., what percentage of the song is a result of his work).

Once computing device 900 generates the first metadata in stage 1064, method 1000J may end at stage 1066 where computing device 900 may calculate a share for each user based on a number of times the audio data file (i.e., the song) is streamed or played and the first contribution value by each user to the audio data file.

Figure 10K:
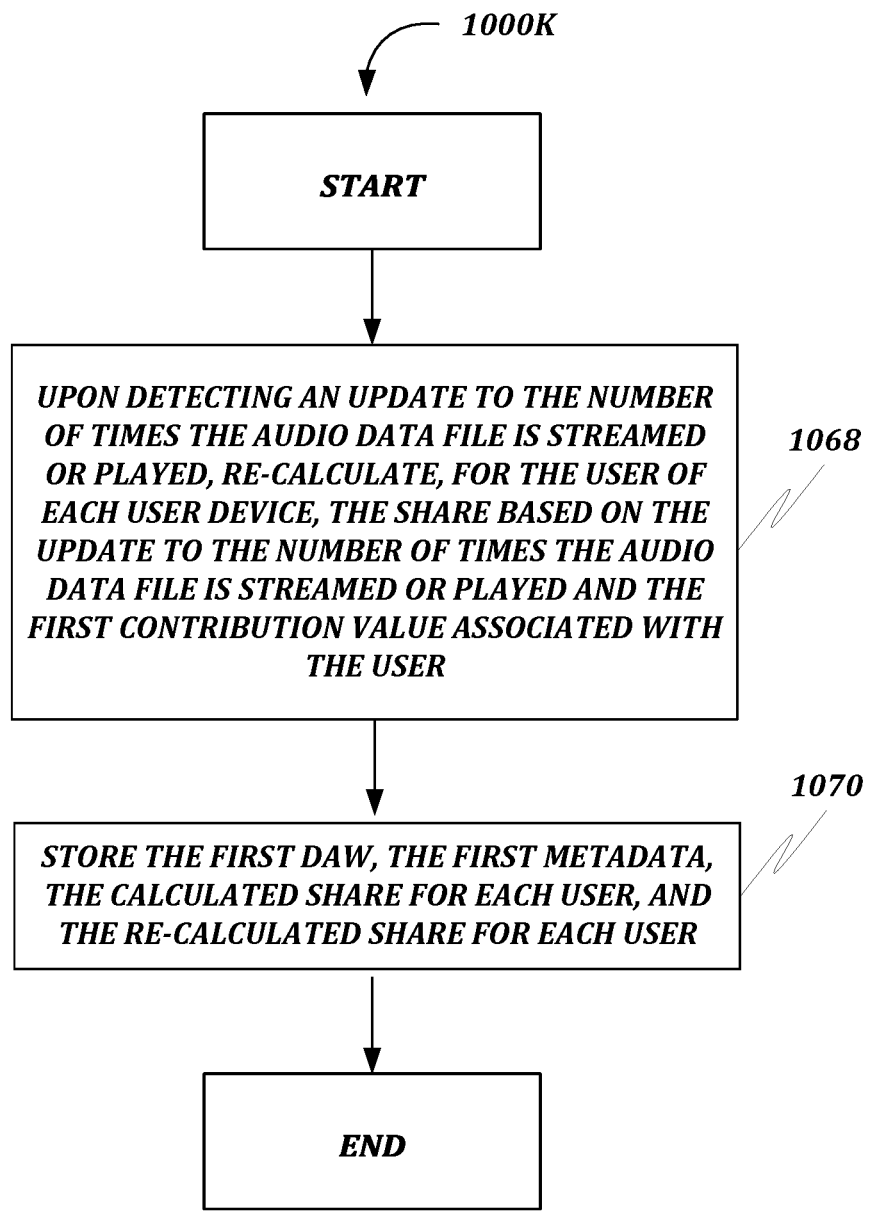

Referring to FIG. 10K now, method 1000K may begin at starting stage 1068 where computing device 900 may, upon detecting an update to the number of times the audio data file is streamed or played, recalculate, for user of each user device, the share based on the update to the number of times the audio data file is streamed or played and the first contribution value associated with the user.

Once computing device 900 re-calculates a share for each user in stage 1068, method 1000K may end at stage 1070 where computing device 900 may store the first DAW, the first metadata, the calculated share for each user, and the re-calculated share for each user.

B. Computing System

Embodiments of the present disclosure provide a hardware and software platform operative as a distributed system of modules and computing elements.

Platform 100 may be embodied as, for example, but not be limited to, a website, a web application, a desktop application, backend application, and a mobile application compatible with a computing device 900. The computing device 900 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Platform 100 may be hosted on a centralized server or a cloud computing service. Although the methods disclosed herein have been sometimes described to be performed by a computing device 900, it should be understood that, in some embodiments, different operations may be performed by a plurality of the computing devices 900 in operative communication at least one network.

Embodiments of the present disclosure may comprise a system having a central processing unit (CPU) 920, a bus 930, a memory unit 940, a power supply unit (PSU) 950, and one or more Input/Output (I/O) units. The CPU 920 coupled to the memory unit 940 and the plurality of I/O units 960 via the bus 930, all of which are powered by the PSU 950. It should be understood that, in some embodiments, each disclosed unit may actually be a plurality of such units for the purposes of redundancy, high availability, and/or performance. The combination of the presently disclosed units is configured to perform the stages any method disclosed herein.

Figure 9:
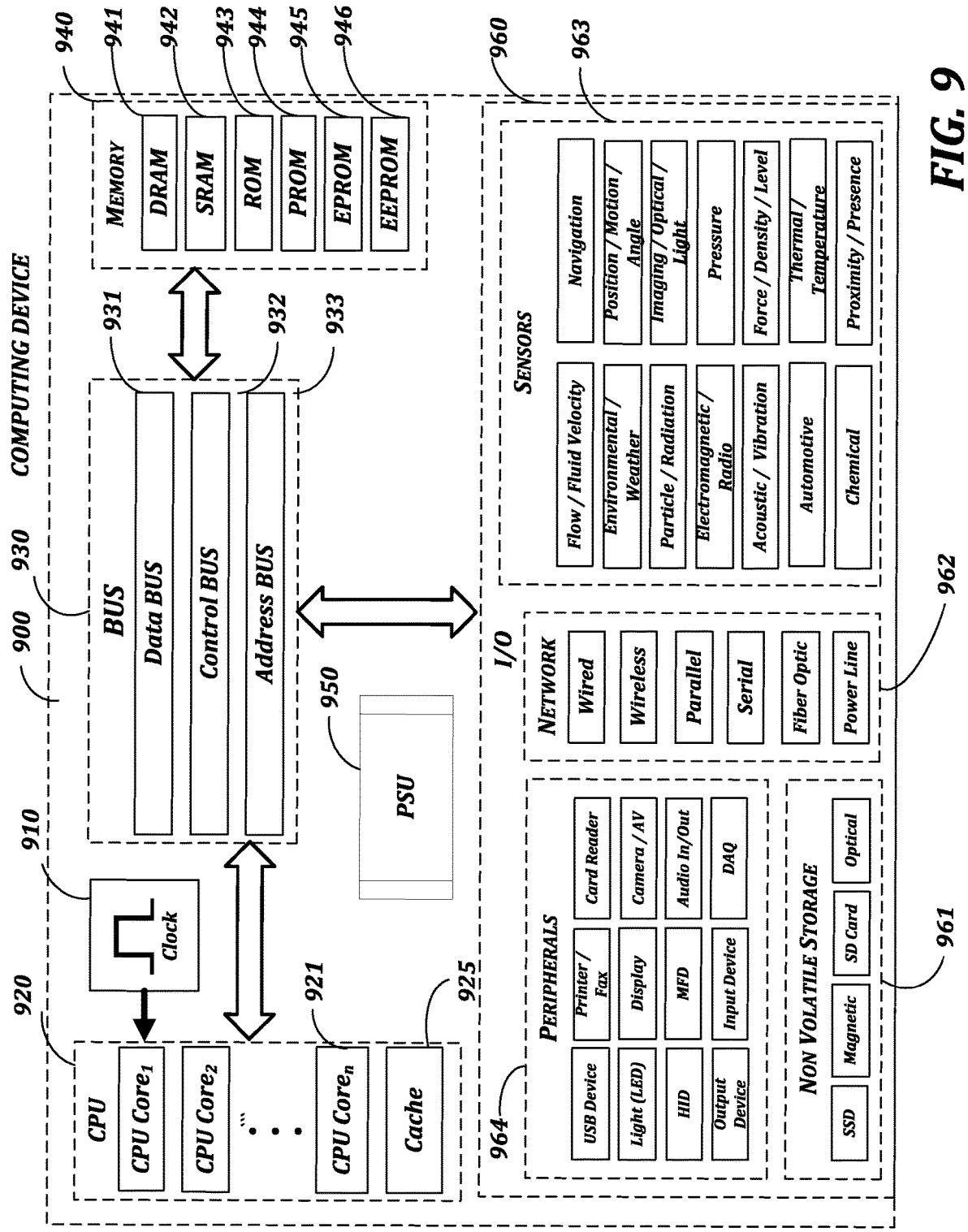
FIG. 9 is a block diagram of a system including a computing device for performing the methods of FIGS. 2-8.

FIG. 9 is a block diagram of a system including computing device 900. Consistent with an embodiment of the disclosure, the aforementioned CPU 920, the bus 930, the memory unit 940, a PSU 950, and the plurality of I/O units 960 may be implemented in a computing device, such as computing device 900 of FIG. 9. Any suitable combination of hardware, software, or firmware may be used to implement the aforementioned units. For example, the CPU 920, the bus 930, and the memory unit 940 may be implemented with computing device 900 or any of other computing devices 900, in combination with computing device 900. The aforementioned system, device, and components are examples and other systems, devices, and components may comprise the aforementioned CPU 920, the bus 930, the memory unit 940, consistent with embodiments of the disclosure.

At least one computing device 900 may be embodied as any of the computing elements illustrated in all of the attached figures, including; A Network Layer, An Authorship/Collaboration Platform Layer, A DAW/Media Layer, A Datastore Layer, An External Device Layer, an Account Layer, A Decentralized Exchange Layer, a Metadata Protocol Module, a Blockchain Protocol Module, A Network Communication Module, a Document Generation Module, A Contract Generation Module, An Authentication Module, A Financial Transaction Module, A Collaboration Module, A Resource Management Module, A Software Integration Module, a methods for attributing authorship, methods for generating a document, methods for reading/writing/monitoring data or metadata stored on a ledger or blockchain, methods facilitating or enabling collaborative digital media authorship or production, and methods for automatic, mechanical royalty calculation and disbursement. A computing device 900 does not need to be electronic, nor even have a CPU 920, nor bus 930, nor memory unit 940. The definition of the computing device 900 to a person having ordinary skill in the art is a device that computes, especially a programmable [usually] electronic machine that performs high-speed mathematical or logical operations or that assembles, stores, correlates, or otherwise processes information. Any device which processes information qualifies as a computing device 900, especially if the processing is purposeful.

With reference to FIG. 9, a system consistent with an embodiment of the disclosure may include a computing device, such as computing device 900. In a basic configuration, computing device 900 may include at least one clock module 910, at least one CPU 920, at least one bus 930, and at least one memory unit 940, at least one PSU 950, and at least one I/O 960 module, wherein I/O module may be comprised of, but not limited to a non-volatile storage sub-module 961, a communication sub-module 962, a sensors sub-module 963, and a peripherals sub-module 964.

A system consistent with an embodiment of the disclosure the computing device 900 may include the clock module 910 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 920, the central component of modern computers, which relies on a clock. The only exceptions are asynchronous circuits such as asynchronous CPUs. The clock 910 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 900 use a "clock multiplier" which multiplies a lower frequency external clock to the appropriate clock rate of the CPU 920. This allows the CPU 920 to operate at a much higher frequency than the rest of the computer, which affords performance gains in situations where the CPU 920 does not need to wait on an external factor (like memory 940 or input/output 960). Some embodiments of the clock 910 may include dynamic frequency change, where, the time between clock edges can vary widely from one edge to the next and back again.

A system consistent with an embodiment of the disclosure the computing device 900 may include the CPU unit 820 comprising at least one CPU Core 921. A plurality of CPU cores 921 may comprise identical CPU cores 921, such as, but not limited to, homogeneous multi-core systems. It is also possible for the plurality of CPU cores 921 to comprise different CPU cores 921, such as, but not limited to, heterogeneous multi-core systems, big.LITTLE systems and some AMD accelerated processing units (APU). The CPU unit 920 reads and executes program instructions which may be used across many application domains, for example, but not limited to, general purpose computing, embedded computing, network computing, digital signal processing (DSP), and graphics processing (GPU). The CPU unit 920 may run multiple instructions on separate CPU cores 921 at the same time. The CPU unit 920 may be integrated into at least one of a single integrated circuit die and multiple dies in a single chip package. The single integrated circuit die and multiple dies in a single chip package may contain a plurality of other aspects of the computing device 900, for example, but not limited to, the clock 910, the CPU 920, the bus 930, the memory 940, and I/O 960.

The CPU unit 920 may contain cache 922 such as, but not limited to, a level 1 cache, level 2 cache, level 3 cache or combination thereof. The aforementioned cache 922 may or may not be shared amongst a plurality of CPU cores 921. The cache 922 sharing comprises at least one of message passing and inter-core communication methods may be used for the at least one CPU Core 921 to communicate with the cache 922. The inter-core communication methods may comprise, but not limited to, bus, ring, two-dimensional mesh, and crossbar. The aforementioned CPU unit 920 may employ symmetric multiprocessing (SMP) design.

The plurality of the aforementioned CPU cores 921 may comprise soft microprocessor cores on a single field programmable gate array (FPGA), such as semiconductor intellectual property cores (IP Core). The plurality of CPU cores 921 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 921, for example, but not limited to Instruction-level parallelism (ILP) such as, but not limited to, super-scalar pipelining, and Thread-level parallelism (TLP).

Consistent with the embodiments of the present disclosure, the aforementioned computing device 900 may employ a communication system that transfers data between components inside the aforementioned computing device 900, and/or the plurality of computing devices 900. The aforementioned communication system will be known to a person having ordinary skill in the art as a bus 930. The bus 930 may embody internal and/or external plurality of hardware and software components, for example, but not limited to a wire, optical fiber, communication protocols, and any physical arrangement that provides the same logical function as a parallel electrical bus. The bus 930 may comprise at least one of, but not limited to a parallel bus, wherein the parallel bus carry data words in parallel on multiple wires, and a serial bus, wherein the serial bus carry data in bit-serial form. The bus 930 may embody a plurality of topologies, for example, but not limited to, a multidrop/electrical parallel topology, a daisy chain topology, and a connected by switched hubs, such as USB bus. The bus 930 may comprise a plurality of embodiments, for example, but not limited to:

Internal data bus (data bus) 831/Memory bus
Control bus 832
Address bus 833
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMH-CIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 900 may employ hardware integrated circuits that store information for immediate use in the computing device 900, know to the person having ordinary skill in the art as primary storage or memory 940. The memory 940 operates at high speed, distinguishing it from the non-volatile storage sub-module 961, which may be referred to as secondary or tertiary storage, which provides slow-to-access information but offers higher capacities at lower cost. The contents contained in memory 940, may be transferred to secondary storage via techniques such as, but not limited to, virtual memory and swap. The memory 940 may be associated with addressable semiconductor memory, such as integrated circuits consisting of silicon-based transistors, used for example as primary storage but also other purposes in the computing device 900. The memory 940 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 941, Static Random-Access Memory (SRAM) 942, CPU Cache memory 925, Advanced Random-Access Memory (A-RAM), and other types of primary storage such as Random-Access Memory (RAM).

Non-volatile memory which can retain stored information even after power is removed, for example, but not limited to, Read-Only Memory (ROM) 943, Programmable ROM (PROM) 944, Erasable PROM (EPROM) 945, Electrically Erasable PROM (EEPROM) 946 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 900 may employ the communication system between an information processing system, such as the computing device 900, and the outside world, for example, but not limited to, human, environment, and another computing device 900. The aforementioned communication system will be known to a person having ordinary skill in the art as I/O 960. The I/O module 960 regulates a plurality of inputs and outputs with regard to the computing device 900, wherein the inputs are a plurality of signals and data received by the computing device 900, and the outputs are the plurality of signals and data sent from the computing device 900. The I/O module 960 interfaces a plurality of hardware, such as, but not limited to, non-volatile storage 961, communication devices 962, sensors 963, and peripherals 964. The plurality of hardware is used by the at least one of, but not limited to, human, environment, and another computing device 900 to communicate with the present computing device 900. The I/O module 960 may comprise a plurality of forms, for example, but not limited to channel I/O, port mapped I/O, asynchronous I/O, and Direct Memory Access (DMA).

Consistent with the embodiments of the present disclosure, the aforementioned computing device 900 may employ the non-volatile storage sub-module 961, which may be referred to by a person having ordinary skill in the art as one of secondary storage, external memory, tertiary storage, off-line storage, and auxiliary storage. The non-volatile storage sub-module 961 may not be accessed directly by the CPU 920 without using intermediate area in the memory 940. The non-volatile storage sub-module 961 does not lose data when power is removed and may be two orders of magnitude less costly than storage used in memory module, at the expense of speed and latency. The non-volatile storage sub-module 861 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (961) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 900 may employ the communication sub-module 962 as a subset of the I/O 960, which may be referred to by a person having ordinary skill in the art as at least one of, but not limited to, computer network, data network, and network. The network allows computing devices 900 to exchange data using connections, which may be known to a person having ordinary skill in the art as data links, between network nodes. The nodes comprise network computer devices 900 that originate, route, and terminate data. The nodes are identified by network addresses and can include a plurality of hosts consistent with the embodiments of a computing device 900. The aforementioned embodiments include, but not limited to personal computers, phones, servers, drones, and networking devices such as, but not limited to, hubs, switches, routers, modems, and firewalls.

Two nodes can be said are networked together, when one computing device 900 is able to exchange information with the other computing device 900, whether or not they have a direct connection with each other. The communication sub-module 962 supports a plurality of applications and services, such as, but not limited to World Wide Web (WWW), digital video and audio, shared use of application and storage computing devices 900, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 862 may comprise a plurality of size, topology, traffic control mechanism and organizational intent. The communication sub-module 962 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 900 may employ the sensors sub-module 963 as a subset of the I/O 960. The sensors sub-module 963 comprises at least one of the devices, modules, and subsystems whose purpose is to detect events or changes in its environment and send the information to the computing device 900. Sensors are sensitive to the measured property, are not sensitive to any property not measured, but may be encountered in its application, and do not significantly influence the measured property. The sensors sub-module 963 may comprise a plurality of digital devices and analog devices, wherein if an analog device is used, an Analog to Digital (A-to-D) converter must be employed to interface the said device with the computing device 900. The sensors may be subject to a plurality of deviations that limit sensor accuracy. The sensors sub-module 963 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 900 may employ the peripherals sub-module 962 as a subset of the I/O 960. The peripheral sub-module 964 comprises ancillary devices uses to put information into and get information out of the computing device 900. There are 3 categories of devices comprising the peripheral sub-module 964, which exist based on their relationship with the computing device 900, input devices, output devices, and input/output devices. Input devices send at least one of data and instructions to the computing device 900. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 900. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 964:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 900. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 900 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 900. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 962 sub-module), data storage device (non-volatile storage 961), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

IV. Aspects

The following disclose various Aspects of the present disclosure. The various Aspects are not to be construed as patent claims unless the language of the Aspect appears as a patent claim. The Aspects describe various non-limiting embodiments of the present disclosure.

First Aspects

1. A method, comprising:
    generating authorship metadata for a data file;
    receiving, from a first user, a first contribution to the data file, the first contribution comprising a change in one or more data values associated with the data file;
    evaluating the first contribution to produce first contribution data; and
    recording the first contribution data in the authorship metadata.

2. The method of aspect 1, further comprising:
    receiving, from a second user, a second contribution to the data file, the second contribution comprising a change in one or more data values associated with the data file;
    evaluating the second contribution to produce second contribution data;
    modifying the authorship metadata based on the second contribution data; and
    determining a relative authorship for the first and second user.

3. The method of aspect 1, wherein the authorship metadata is written onto a media file in a digital audio workstation.

4. The method of aspect 3, wherein the digital audio workstation has information about the first user and is licensed to the first user.

5. The method of aspect 3, wherein the media file is a raw media file.

6. The method of aspect 1, further comprising:
    receiving, from a second user, a second contribution to the data file;
    evaluating the first and second contributions to produce contribution data; and
    recording the contribution data in the authorship metadata.

7. The method of aspect 1, further comprising:
    receiving, from a plurality of users, a plurality of contributions to the data file, the plurality of contributions each comprising a change in one or more data values associated with the data file;
    evaluating the plurality of contributions to produce contribution data for each contribution; and
    recording the contribution data for each contribution in the authorship metadata.

8. The method of aspect 1, wherein the authorship metadata is recorded on a ledger.

9. The method of aspect 1, wherein the authorship metadata is recorded on a blockchain.

10. The method of aspect 1, wherein the authorship metadata is generated within a digital audio workstation.

11. The method of aspect 2, wherein the authorship metadata is generated within a first digital audio workstation and the authorship metadata is modified within a second, different digital audio workstation.

12. The method of aspect 6, wherein the plurality of contributions to the data file are made on a plurality of local digital audio workstations.

13. The method of aspect 6, wherein the plurality of contributions to the data file are made on a plurality of remote digital audio workstations.

14. The method of aspect 6, wherein the plurality of contributions to the data file are made using a plurality of different digital audio workstations, and the method further comprises a selection from the following:
    reading the authorship metadata using the plurality of different digital audio workstations, editing the authorship metadata using the plurality of different digital audio workstations, and changing the authorship metadata using the plurality of different digital audio workstations.

15. The method of aspect 1, wherein the first contribution is evaluated in real time as the first contribution is being made to produce the first contribution data.

16. The method of aspect 6, wherein the plurality of contributions is evaluated using machine learning.

Second Aspects

1. A method, comprising:
   receiving metadata for a data file;
   parsing the metadata into terms, the terms comprising a list of users and relative copyright ownership for each user of the list of users; and
   automatically generating a legal document from the terms representing the relative copyright ownership in the data file for each user of the list of users.

2. The method of aspect 1, further comprising:
   obtaining a signature from one or more users of the list of users.

3. The method of aspect 1, wherein the legal document is a printed contract.

4. The method of aspect 1, wherein the legal document is embodied in a smart contract.

5. The method of aspect 4, wherein the legal document is recorded using a ledger.

6. The method of aspect 4, wherein the legal document is recorded on a blockchain.

7. The method of aspect 3, wherein the legal document is a copyright application document.

8. The method of aspect 1, further comprising:
   detecting that a royalty payment associated with the data file has been made; and
   automatically disbursing the royalty payment to each user of the list of users according to the relative copyright ownership represented in the legal document.

Third Aspects

1. A method comprising:
   recording one or more changes to a data file during a digital audio workstation session;
   collecting user data during the digital audio workstation session;
   analyzing the user data to produce analytics;
   generating documentation containing the analytics; and
   storing the data file and the documentation.

2. The method of aspect 1, wherein the user data comprises a log of the changes, the analytics contains authorship metadata for the data file, and the method further comprises analyzing the log to produce authorship metadata.

3. The method of aspect 1, wherein the documentation and data file are decentrally stored.

4. The method of aspect 1, wherein the documentation and data file are stored in a ledger.

5. The method of aspect 1, wherein the documentation and data file are stored on a blockchain.

6. The method of aspect 1, wherein the digital audio workstation generates the documentation and stores the documentation and the data file in one or more decentralized locations.

7. The method of aspect 1, further comprising:
   changing one or more portions of a data file during a plurality of digital audio workstation sessions to produce a plurality of session data files; and,
   for each digital audio workstation session of the plurality of digital audio workstation sessions,
   collecting session user data during the digital audio workstation session;
   recording a session data file;
   analyzing the session user data to produce session analytics;
   generating associated session documentation containing the session analytics; and
   storing the session data file and associated session documentation for the digital audio workstation session.

8. The method of aspect 7, wherein each session data file of the plurality of session data files is stored on a ledger along with metadata associated with the session data file.

9. The method of aspect 8, wherein the metadata contains the associated session documentation for the session data file.

10. The method of aspect 1, further comprising:
    generating a hash value for the data file; and
    recording the hash value in the documentation.

11. The method of aspect 7, further comprising: for each digital audio workstation session of the plurality of digital audio workstation sessions, generating a hash value for the session data file and recording the hash value in the association session documentation.

Fourth Aspects

1. A method comprising:
   running a web browser on a computing device;
   operating a remote digital audio workstation using the web browser;
   recording, in the remote digital audio workstation, changes to a data file; and
   recording, in the remote digital audio workstation, metadata associated with the data file.

2. The method of aspect 1, further comprising:
   running a plurality of web browsers on a plurality of computing devices;
   operating a remote digital audio workstation using the plurality of web browsers to make one or more changes to the data file during one or more sessions;
   recording, in the remote digital audio workstation, each change of the plurality of changes to the data file; and
   recording, in the remote digital audio workstation, metadata associated with each of the one or more sessions.

3. The method of aspect 1, wherein the remote digital audio workstation uses resources of the computing device.

4. The method of aspect 1, comprising:
   operating a local digital audio workstation on the local computing device; and
   connecting the local digital audio workstation to the remote digital audio workstation.

5. The method of aspect 4, comprising synchronizing, on the local digital audio workstation and the remote digital audio workstation, a selection from the following: the data file, a history of the data file, a version value for the data file, a current metadata for the data file, a historical metadata for the data file, and authorship data for the data file.

6. The method of aspect 2, wherein the remote digital audio workstation uses resources of the plurality of computing devices.

7. The method of aspect 1, wherein the metadata includes authorship data for the data file.

Fifth Aspects

1. A method, comprising:
   determining that a rendered media file having a plurality of authors has generated a royalty, the rendered media file having associated therewith metadata containing one or more relative authorship values for the plurality of authors; and, for each author of the plurality of authors;
   identifying, from the metadata, a relative authorship value for the author;
   determining a disbursement amount according to the relative authorship value and the royalty; and facilitating a payment of the disbursement amount to the author.

2. The method of aspect 1, wherein each author of the plurality of authors made a contribution to the rendered media file using a digital audio workstation having user information for the associated author, and wherein the user information is used to facilitate the disbursement for each author.

3. The method of aspect 2, wherein the user information comprises a selection of at least one of the following: a name, a phone number, an email address, a physical address, a set of bank account information, and a set of other account information.

4. The method of aspect 1, further comprising:
parsing, from the metadata, the authorship values; and
automatically generating an enforceable legal document apportioning copyright ownership in the media file based on the parsed authorship values.

5. The method of aspect 1, comprising receiving an agreement to a smart contract from each author of the plurality of authors, the smart contract agreement comprising an agreement to an apportionment of copyright ownership in the media file that is automatically generated based on authorship values parsed from the metadata.

6. The method of aspect 1, further comprising:
recording a change to the rendered media file made by a first user in a first digital audio workstation that results in a changed rendered media file;
evaluating the change to the rendered media file to produce first authorship data for the first user;
recording the first authorship data in the metadata for the changed rendered media file;
identifying, from the metadata, a first relative authorship value for the first user;
determining a first disbursement amount for the first user according to the first relative authorship value; and
facilitating a payment of the first disbursement amount to the first user.

7. The method of aspect 6, wherein the payment of the first disbursement amount to the first user is automated using account information for a first user account belonging to the first user of the first digital audio workstation.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A method, comprising:
generating authorship metadata for a data file associated with at least one digital audio workstation (DAW);
receiving, from a first user, a first contribution to the data file, the first contribution comprising a first change in one or more data values associated with the data file;
evaluating the first contribution to produce contribution data;
recording the contribution data in the authorship metadata to a distributed ledger maintained by a public blockchain;
generating a smart contract based on the recorded contribution data;
detecting an update to the distributed ledger on the public blockchain corresponding to a change to the contribution data; and
generating a modified smart contract to reflect parameters associated with the detected change to the contribution data.

2. The method of claim 1, further comprising:
receiving, from a second user, a second contribution to the data file, the second contribution comprising a second change in the one or more data values associated with the data file;
evaluating the second contribution to produce second contribution data;
modifying the authorship metadata based on the second contribution data; and
determining a relative authorship for the first user and the second user.

3. The method of claim 2, wherein the authorship metadata is generated within a first digital audio workstation and the authorship metadata is modified within a second, different digital audio workstation.

4. The method of claim 1, wherein the authorship metadata is written onto a media file in a digital audio workstation.

5. The method of claim 4, wherein the digital audio workstation has information about the first user and is licensed to the first user.

6. The method of claim 4, wherein the media file is a raw media file.

7. The method of claim 1, further comprising:
receiving, from a second user, a second contribution to the data file;
evaluating the first contribution and the second contribution to produce the contribution data; and
recording the contribution data in the authorship metadata.

8. The method of claim 7, wherein the first contribution and the second contribution to the data file are made on a plurality of local digital audio workstations.

9. The method of claim 7, wherein the first contribution and the second contribution to the data file are made on a plurality of remote digital audio workstations.

10. The method of claim 7, wherein the first contribution and the second contribution to the data file are made using a plurality of different digital audio workstations, and the method further comprises a selection from the following:
reading the authorship metadata using the plurality of different digital audio workstations, editing the authorship metadata using the plurality of different digital audio workstations, and changing the authorship metadata using the plurality of different digital audio workstations.

11. The method of claim 1, wherein the first contribution is evaluated in real time as the first contribution is being made to produce the contribution data.

12. The method of claim 1, further comprising:
receiving, from a plurality of users, a plurality of contributions to the data file, the plurality of contributions each comprising an additional change in the one or more data values associated with the data file;
evaluating the plurality of contributions to produce the contribution data for each contribution;

recording the contribution data for each of the plurality of contributions in the authorship metadata to the distributed ledger on the public blockchain;

wherein generating the smart contract comprises generating the smart contract based on the recorded contribution data on the public blockchain;

detecting an update to the distributed ledger on the public blockchain corresponding to a change in the contribution data for at least one of the plurality of contributions in the authorship metadata; and wherein generating the modified smart contract comprises generating the modified smart contract based on the detected change to at least one of the plurality of contributions in the authorship metadata.

13. The method of claim 1, wherein the authorship metadata is recorded on the distributed ledger.

14. The method of claim 13, wherein the distributed ledger is maintained by the public blockchain.

15. The method of claim 1, wherein the authorship metadata is generated within the at least one digital audio workstation.

16. The method of claim 7, wherein the first contribution and the second contribution are evaluated using machine learning.

* * * * *